US012597783B2

(12) United States Patent
Kuranuki

(10) Patent No.: US 12,597,783 B2
(45) Date of Patent: Apr. 7, 2026

(54) ENERGY TRANSFER CIRCUIT, AND ELECTRICITY STORAGE SYSTEM

(71) Applicant: Panasonic Intellectual Property Management Co., Ltd., Osaka (JP)

(72) Inventor: Masaaki Kuranuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1041 days.

(21) Appl. No.: 17/635,689

(22) PCT Filed: Sep. 8, 2020

(86) PCT No.: PCT/JP2020/033861
§ 371 (c)(1),
(2) Date: Feb. 15, 2022

(87) PCT Pub. No.: WO2021/059949
PCT Pub. Date: Apr. 1, 2021

(65) Prior Publication Data
US 2022/0285949 A1     Sep. 8, 2022

(30) Foreign Application Priority Data
Sep. 25, 2019     (JP) ................................. 2019-174616

(51) Int. Cl.
*H02J 7/52*          (2026.01)
*H02J 7/56*          (2026.01)
(Continued)

(52) U.S. Cl.
CPC .................. *H02J 7/52* (2026.01); *H02J 7/56* (2026.01); *H02J 7/62* (2026.01); *H02J 7/80* (2026.01)

(58) Field of Classification Search
CPC ...................................................... H02J 7/0013
See application file for complete search history.

(56) References Cited

U.S. PATENT DOCUMENTS 3,582,754 A * 6/1971 Hoffmann ........... H02M 3/3382
                                                   331/117 R
3,611,016 A * 10/1971 Rogers ................. H04Q 3/0012
                                                   333/124
(Continued)

FOREIGN PATENT DOCUMENTS

CN          103875156 A       6/2014
CN          107528371 A      12/2017
(Continued)

OTHER PUBLICATIONS

JP-4999353 Translation, Power Storage Device, Portable Device and Electric Vehicle, Kihara (Year: 2012).*
(Continued)

*Primary Examiner* — Tynese V McDaniel
(74) *Attorney, Agent, or Firm* — Rimon P.C.

(57) ABSTRACT

Cell selection circuit is provided between n cells connected in series, where n is an integer of 2 or more, and inductor, and is provided at both ends of the selected cell and both ends of inductor can be conductive. Clamp circuit includes at least one clamp switch for forming a closed loop including inductor in a state where cell selection circuit does not select any cells. Current detection circuit detects the value of the current flowing through inductor. Low-pass filter band-limits the detection value. Overcurrent detection circuit activates the protection of inductor when the band-limited detection value exceeds the threshold.

17 Claims, 18 Drawing Sheets

(51) Int. Cl.
     H02J 7/62          (2026.01)
     H02J 7/80          (2026.01)

(56)              References Cited

U.S. PATENT DOCUMENTS 5,982,142 A  *  11/1999  Sullivan ................ H02J 7/0018
                                                          320/118
      7,224,948 B1 *   5/2007  Yamawaki ........ H04L 25/03343
                                                          455/119
   2008/0231346 A1 *   9/2008  Hung .................... H03L 7/0898
                                                          327/536
   2009/0289609 A1 *  11/2009  Hashimoto ...... G01R 31/31721
                                                          323/282
   2013/0093248 A1 *   4/2013  Liu .................... H01M 10/441
                                                          307/77
   2013/0093395 A1 *   4/2013  Liu ...................... H02J 7/0014
                                                          320/118
   2013/0328734 A1 *  12/2013  Thind ...................... H03H 7/40
                                                          343/745
   2014/0340022 A1    11/2014  Kang et al.

2015/0115923 A1 *   4/2015  Shao ..................... H02M 3/157
                                                          323/283
   2015/0303815 A1 *  10/2015  Chen ..................... H02M 3/158
                                                          363/21.04
   2017/0033759 A1 *   2/2017  Saigusa ............. H03H 11/1252

FOREIGN PATENT DOCUMENTS

JP            7-322516          12/1995
JP            4999353  B2 *    8/2012
WO        2013/056093  A1      4/2013

OTHER PUBLICATIONS

The EPC Office Action dated Nov. 4, 2022 for the related European
Patent Application No. 20869087.5.
International Search Report of PCT application No. PCT/JP2020/
033861 dated Nov. 10, 2020.
English Translation of Chinese Office Action dated May 29, 2025
for the related Chinese Patent Application No. 202080056563.6.
The EPC Office Action dated Mar. 26, 2025 for the related European
Patent Application No. 20869087.5.

* cited by examiner

1

1

(a)

(b)

(c)

1

1

(a)

(e)

(b)

(f)

(c)

(g)

(d)

(h)

(a) Without ringing noise (b) With ringing noise (c) After passing through low-pass filter (a) Without ringing noise (b) With ringing noise (c) After passing through low-pass filter (a)  Without filter (b) fc=20[MHz]

(a) fc=8[MHz]

(b) fc=4[MHz]

(a) fc=2[MHz]

(b) fc=1[MHz]

(a) Without filter (b) fc=20[MHz]

(a) fc=2[MHz]

(b) fc=1[MHz]

(a) fc=0.5[MHz]

(b) fc=0.25[MHz]

ENERGY TRANSFER CIRCUIT, AND ELECTRICITY STORAGE SYSTEM

TECHNICAL FIELD

The present invention relates to an energy transfer circuit and a power storage system that transfers energy between a plurality of cells or modules connected in series.

BACKGROUND ART

In recent years, secondary batteries such as lithium-ion batteries and nickel-metal-hydride batteries have been used for various purposes. The secondary batteries are each used for an in-vehicle (including an electric bicycle) application for supply of electric power to a drive motor of an electric vehicle (EV), a hybrid electric vehicle (HEV), or a plug-in hybrid vehicle (PHV), for power storage for a peak shift or a backup, and for frequency regulation (FR) for stabilizing a frequency of a system, for example.

Generally, the secondary battery such as the lithium-ion battery executes an equalizing process for equalizing capacities between a plurality of cells connected in series from the viewpoint of maintaining power efficiency and ensuring safety. The equalizing process includes a passive method and an active method. The passive method is a method for equalizing capacities of a plurality of cells connected in series by connecting a discharge resistor to each of the plurality of cells, and discharging the other cells so as to match the voltages of the other cells with a voltage of a cell having the lowest voltage. The active method is a method for equalizing capacities of a plurality of cells connected in series by transferring energy between the plurality of cells. Although the active method has less power loss than the passive method and can reduce a heat generation amount, the passive method with a simple circuit configuration at low cost is currently the mainstream.

In recent years, a battery pack has been increased in energy capacity and output, especially in in-vehicle applications. That is, the capacity of each cell in the battery pack and the number of series connections of cells are increasing. This causes an imbalance of an energy amount between the plurality of cells to increase. Therefore, the equalizing process also increases a time required to eliminate the imbalance between the plurality of cells.

In contrast, reduction in time required for the equalizing process is required especially in the in-vehicle applications. In order to eliminate a large energy imbalance in a short time, it is necessary to apply a large current for equalization. The passive method eliminates an imbalance of energy by consuming a capacity of a cell having a high voltage using a resistor, so that increase in amount of current flowing into the resistor increases a heat generation amount. As the number of series connections of cells increases as described above, a heat dissipation area for heat generated in the resistor is less likely to be secured on a substrate.

This increases need for the active method in which energy is transferred to a cell having a small capacity instead of converting the energy into heat to consume the energy. As a configuration of an active equalizing circuit, there is a configuration in which an inductor is connected between the midpoint of two cells and the midpoint of two switches connected in parallel to the two cells (see, for example, PTL 1).

CITATION LIST

Patent Literature

PTL 1: Unexamined Japanese Patent Publication No. 7-322516

SUMMARY OF THE INVENTION

In an active equalizing circuit using an inductor, it is necessary to provide an overcurrent protection circuit in order to prevent the inductor from saturating. The high frequency noise associated with switching is superimposed on the detection waveform of the current flowing through the inductor. In order to suppress this high frequency noise, it is conceivable to install a low-pass filter in front of the overcurrent detection circuit.

In the overcurrent protection circuit of the active type equalizing circuit described above, it is necessary to capture the peak current value at the moment when the inductor current switches from rising to falling, but due to the influence of the low-pass filter, it is difficult to capture the true peak current value.

Further, in order to prevent the false detection of the overcurrent protection circuit due to a high frequency noise, it is necessary to design a large time constant of the low-pass filter and a low threshold for overcurrent detection. In this case, the performance of the inductor cannot be fully utilized. The margin is excessively designed with respect to the range of normal operation, and a large waste is generated in the circuit scale and cost.

The present disclosure has been made in view of these circumstances, and an object of the present invention is to provide a technique for achieving highly accurate overcurrent protection at an appropriate circuit scale and cost in an energy transfer circuit including an inductor.

In order to solve the above problems, an energy transfer circuit of an aspect of the present disclosure includes an inductor, a cell selection circuit provided between n cells connected in series, where n is an integer of 2 or more, and the inductor and capable of conducting both ends of a selected cell including any one of the n cells or a plurality of cells connected in series, and both ends of the inductor, a clamp circuit having at least one clamp switch for forming a closed loop including the inductor with the cell selection circuit not selecting any cells, a current detection circuit configured to detect a value of a current flowing through the inductor, a low-pass filter configured to band-limit a detection value detected by the current detection circuit, and an overcurrent detection circuit configured to activate protection of the inductor when a detection value band-limited by the low-pass filter exceeds a threshold.

According to the present disclosure, in an energy transfer circuit including an inductor, highly accurate overcurrent protection can be achieved at an appropriate circuit scale and cost.

DESCRIPTION OF EMBODIMENTS

Figure 1:
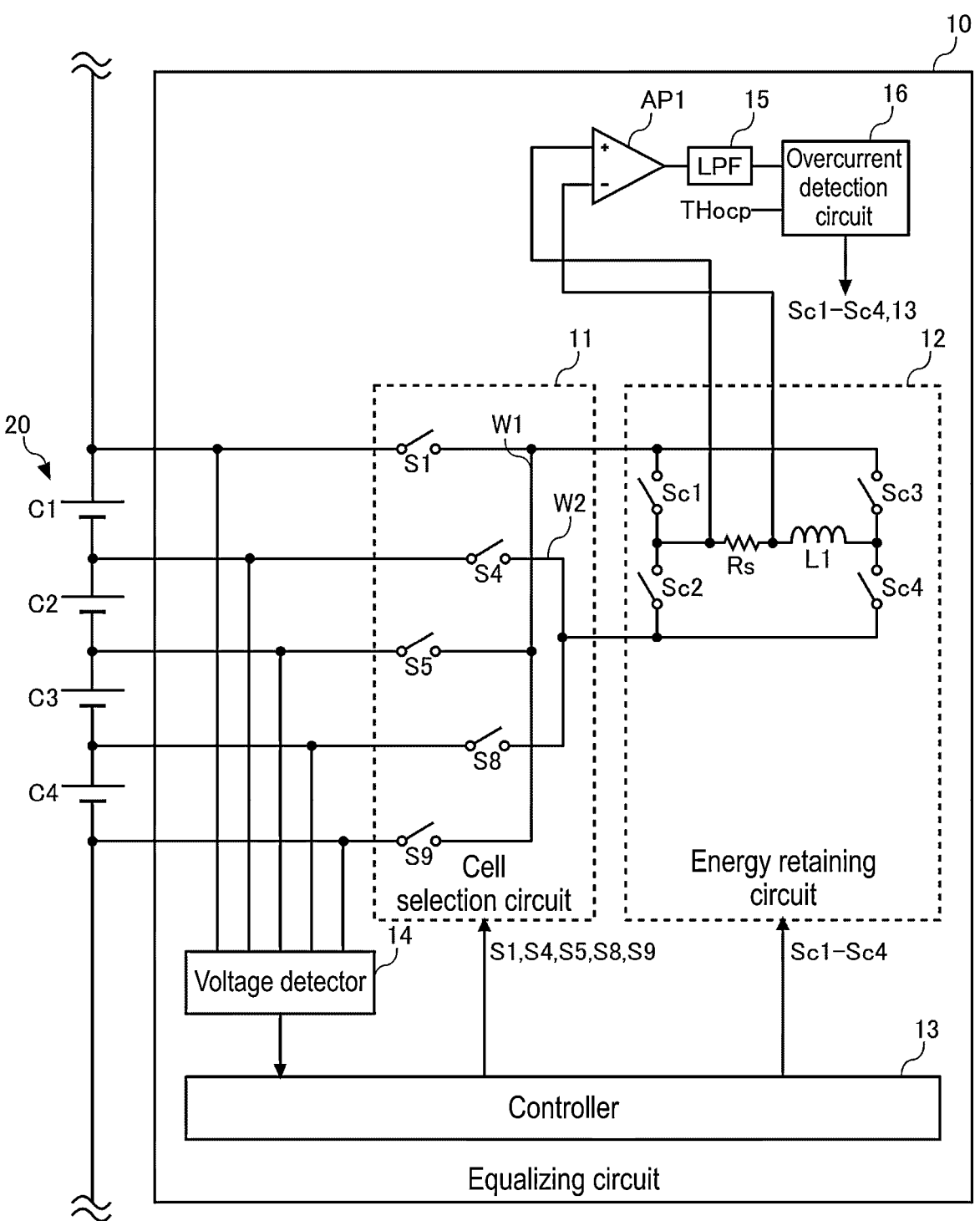
FIG. 1 is a diagram showing a configuration example 1 of a power storage system according to a first exemplary embodiment.

FIG. 1 is a diagram showing a configuration example 1 of power storage system 1 according to a first exemplary embodiment. Power storage system 1 includes equalizing circuit 10 and power storage 20. Power storage 20 includes n cells connected in series, where n is an integer of 2 or more. FIG. 1 illustrates an example in which four cells C1 to C4 are connected in series. A number of cells connected in series varies according to voltage specifications required for power storage system 1.

For each cell, a rechargeable power storage element such as a lithium-ion battery cell, a nickel-metal-hydride battery cell, a lead battery cell, an electric double layer capacitor cell, and a lithium-ion capacitor cell is available. Hereinafter, in the present specification, an example using a lithium-ion battery cell (having nominal voltage of 3.6 V to 3.7 V) is assumed.

Equalizing circuit 10 includes voltage detector 14, cell selection circuit 11, energy retaining circuit 12, controller 13, and an overcurrent protection unit. Voltage detector 14 detects a voltage of each of n (four in FIG. 1) cells connected in series. Specifically, voltage detector 14 is connected to nodes of n cells connected in series by (n+1) voltage lines, and detects a voltage between two adjacent voltage lines, thereby detecting a voltage of each cell. Voltage detector 14 can be configured with, for example, a general-purpose analog front-end integrated circuit (IC) or an application specific integrated circuit (ASIC). Voltage detector 14 converts the detected voltage of each of the cells into a digital value to output it to controller 13.

Cell selection circuit 11 is a circuit provided between the n cells connected in series and inductor L1 included in energy retaining circuit 12, and capable of electrically connecting both ends of a cell selected from among the n cells to both ends of inductor L1. Cell selection circuit 11 includes first wiring W1 connected to a first end of inductor L1, second wiring W2 connected to a second end of inductor L1, a plurality of first wiring side switches, and at least one second wiring side switch.

The plurality of first wiring side switches is connected between odd-numbered nodes and first wiring W1 among (n+1) nodes of the n cells connected in series. At least one second wiring side switch is connected between even-numbered nodes and second wiring W2 among the (n+1) nodes of the n cells connected in series.

In the example shown in FIG. 1, n=4 and the number of nodes=5 are satisfied, and cell selection circuit 11 has three first wiring side switches and two second wiring side switches. In FIG. 1, first switch S1, fifth switch S5, and ninth switch S9 are the first wiring side switches, and fourth switch S4 and eighth switch S8 are the second wiring side switches.

Energy retaining circuit 12 (also referred to as a clamp circuit) includes inductor L1, first clamp switch Sc1, second clamp switch Sc2, third clamp switch Sc3, and fourth clamp switch Sc4. First clamp switch Sc1, second clamp switch Sc2, third clamp switch Sc3, and fourth clamp switch Sc4 form a full bridge circuit. Specifically, a first arm in which first clamp switch Sc1 and second clamp switch Sc2 are connected in series, and a second arm in which third clamp switch Sc3 and fourth clamp switch Sc4 are connected in series are connected in parallel between first wiring W1 and second wiring W2. Inductor L1 is connected between a node between first clamp switch Sc1 and second clamp switch Sc2 and a node between third clamp switch Sc3 and fourth clamp switch Sc4.

First clamp switch Sc1 to fourth clamp switch Sc4 can electrically connect both the ends of inductor L1 in energy retaining circuit 12. Specifically, in a state where cell selection circuit 11 does not select any cells, first clamp switch Sc1 and third clamp switch Sc3 are controlled to a conducting state, and second clamp switch Sc2 and fourth clamp switch Sc4 are controlled to a non-conducting state, or first clamp switch Sc1 and third clamp switch Sc3 are controlled to a non-conducting state, and second clamp switch Sc2 and fourth clamp switch Sc4 are controlled to a conducting state, and thereby a closed loop including inductor L1 can be formed in energy retaining circuit 12.

First clamp switch Sc1 to fourth clamp switch Sc4 can switch a direction of a current flowing to inductor L1. Specifically, in a state where cell selection circuit 11 selects any cell, first clamp switch Sc1 and fourth clamp switch Sc4 are controlled to a conducting state, and second clamp switch Sc2 and third clamp switch Sc3 are controlled to a non-conducting state, or first clamp switch Sc1 and fourth clamp switch Sc4 are controlled to a non-conducting state, and second clamp switch Sc2 and third clamp switch Sc3 are controlled to a conducting state, and thereby the direction of the current flowing to inductor L1 can be switched.

Controller 13 executes an equalizing process on the n cells connected in series based on the voltage of each of then cells detected by voltage detector 14. Controller 13 can be, for example, a microcomputer. Controller 13 and voltage detector 14 may be formed integrated into one chip.

In the present exemplary embodiment, controller 13 executes an equalizing process on the n cells connected in series by an active cell balance method. In the active cell balance method according to the present exemplary embodiment, energy is transferred from one cell (cell to be discharged) to another cell (cell to be charged) between the n cells connected in series to equalize capacities of one cell and the other cell. Repeating this energy transfer equalizes capacities of the n cells connected in series.

First, controller 13 controls first clamp switch Sc1 and fourth clamp switch Sc4 to a conducting state and second clamp switch Sc2 and third clamp switch Sc3 to a non-conducting state, or controls first clamp switch Sc1 and fourth clamp switch Sc4 to a non-conducting state and second clamp switch Sc2 and third clamp switch Sc3 to a conducting state, and controls cell selection circuit 11 to electrically connect both ends of the cell to be discharged among the n cells and both the ends of inductor L1 for a predetermined time to create a discharge path. In a state where the discharge path is created, a current flows between the cell to be discharged and inductor L1, and a state where a current flows from the cell to be discharged to inductor L1 (also referred to as an inductor increase state) occurs, and energy is stored in inductor L1.

Subsequently, controller 13 controls cell selection circuit 11 to electrically shut off the n cells and inductor L1, and controls first clamp switch Sc1 and third clamp switch Sc3 to a conducting state, and second clamp switch Sc2 and fourth clamp switch Sc4 to a non-conducting state, or controls first clamp switch Sc1 and third clamp switch Sc3 to a non-conducting state, and second clamp switch Sc2 and fourth clamp switch Sc4 to a conducting state to create a clamp path. In this clamp state, a circulating current flows through the closed loop, and an inductor current is actively clamped in energy retaining circuit 12.

Subsequently, controller 13 controls first clamp switch Sc1 and fourth clamp switch Sc4 to a conducting state, and second clamp switch Sc2 and third clamp switch Sc3 to a non-conducting state, or controls first clamp switch Sc1 and fourth clamp switch Sc4 to a non-conducting state, and second clamp switch Sc2 and third clamp switch Sc3 to a conducting state, and controls cell selection circuit 11 to electrically connect both ends of the cell to be charged among the n cells and both the ends of inductor L1 for a predetermined time to create a charge path. In a state where the charge path is created, a current flows between the cell to be charged and inductor L1, and a state where an inductor current actively clamped in energy retaining circuit 12 flows in the cell to be charged (also referred to as an inductor current reduction state) occurs. Accordingly, the energy transfer from one cell to another is completed.

Equalizing circuit 10 includes shunt resistor Rs, differential amplifier AP1, low-pass filter 15, and overcurrent detection circuit 16 as configuration elements of the overcurrent protection unit. Shunt resistor Rs is connected in series with inductor L1. Differential amplifier AP1 amplifies the voltage across shunt resistor Rs to output it to low-pass filter 15. Shunt resistor Rs and differential amplifier AP1 function as a current detection circuit configured to detect the value of the current flowing through inductor L1.

The value of the current detected by the current detection circuit passes through low-pass filter 15. Low-pass filter 15 can be configured by a general RC filter circuit. The method of setting cutoff frequency fc of the RC filter circuit will be described later.

Overcurrent detection circuit 16 compares the detection value that has passed through low-pass filter 15 with overcurrent protection threshold THocp, and activates the protection of inductor L1 when the detection value that has passed through low-pass filter 15 exceeds overcurrent protection threshold THocp.

Overcurrent detection circuit 16 can be composed of an absolute value circuit and a comparator. The absolute value circuit converts the detection value that has passed through low-pass filter 15 into an absolute value to output it to the comparator. Since the current flows in both directions through inductor L1, the polarity of the current detection value is unified by providing an absolute value circuit in front of the comparator.

Further, overcurrent detection circuit 16 may be composed of a positive side comparator that detects a positive overcurrent and a negative side comparator that detects a negative overcurrent. The outputs of the positive and negative comparators are connected by a diode OR circuit, and when an overcurrent is detected by either the positive or negative comparator, the protection of inductor L1 is activated.

Further, overcurrent detection circuit 16 may be configured by a comparator capable of switching between positive overcurrent protection threshold THocp+ and negative overcurrent protection threshold THocp−. Controller 13 controls the direction of the current flowing through inductor L1 by controlling the on/off of first clamp switch Sc1 to the fourth clamp switch Sc4. Controller 13 notifies overcurrent detection circuit 16 of the direction of the current flowing through inductor L1, and overcurrent detection circuit 16 switches between positive overcurrent protection threshold THocp+ and negative overcurrent protection threshold THocp− depending on the direction of the current flowing through inductor L1. In this case, the absolute value circuit can be omitted.

There are two methods to protect inductor L1 when overcurrent is detected. The first method is to stop the operation of equalizing circuit 10. Overcurrent detection circuit 16 outputs an abnormality stop signal when an overcurrent is detected. The abnormality stop signal is output to the control terminals of first clamp switch Sc1 to fourth clamp switch Sc4 and first clamp switch Sc1 to fourth clamp switch Sc4 are turned off when the abnormality stop signal is received. The abnormality stop signal is also output to controller 13, and when controller 13 receives the abnormality stop signal, the operation of equalizing circuit 10 is stopped.

The second method is a method of continuing the operation of equalizing circuit 10 while blocking the current flowing into inductor L1. Overcurrent detection circuit 16 outputs an abnormality signal to controller 13 when an overcurrent is detected. Upon receiving the abnormality signal, controller 13 immediately transitions equalizing circuit 10 to the clamp state. As described above, in the clamp state, the n cells and inductor L1 are electrically cut off, so that the current discharged from the cells is prevented from flowing into inductor L1. After that, controller 13 returns to normal control. When the overcurrent is detected a plurality of times within a predetermined time, controller 13 may stop the operation of equalizing circuit 10 instead of transitioning it to the clamp state.

Whether to adopt the first method or the second method depends on the application of equalizing circuit 10. The first method is used for the application where safety is important, and the second method is used for the application where continuity of operation is important.

Figure 2:
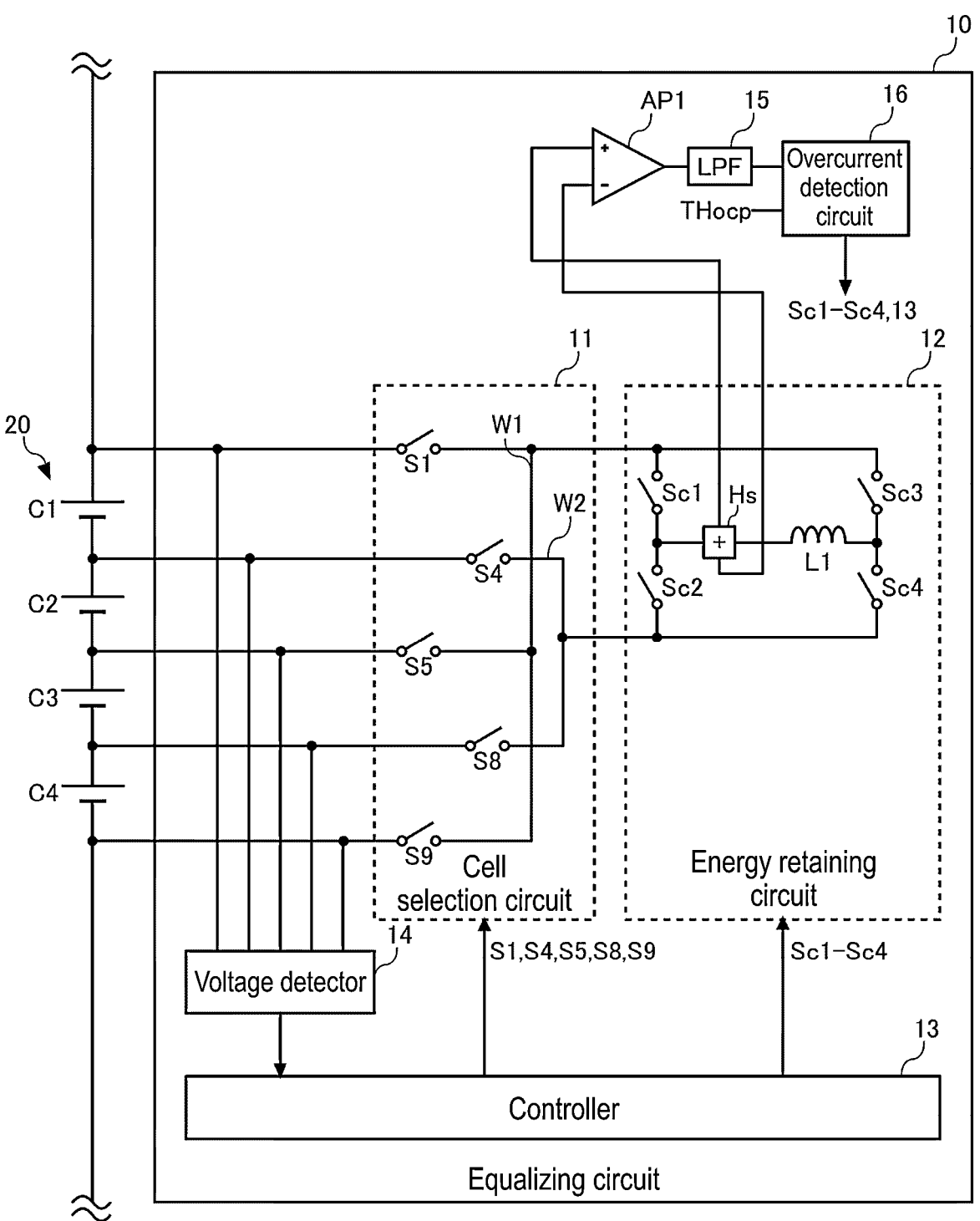
FIG. 2 is a diagram showing a configuration example 2 of the power storage system according to the first exemplary embodiment.

FIG. 2 is a diagram showing the configuration example 2 of power storage system 1 according to the first exemplary embodiment. The configuration example 2 shown in FIG. 2 is different from the configuration example 1 shown in FIG. 1 in the configuration of the overcurrent detector. In the configuration example 2, Hall element Hs is included instead of shunt resistor Rs. Hall element Hs generates a voltage corresponding to the current flowing through inductor L1 by applying a magnetic field in the vertical direction to the current flowing through inductor L1. Subsequent configurations are the same as the configuration example 1.

FIG. 3(a) to FIG. 3(h) are circuit diagrams for explaining a basic operation sequence example of the equalizing process of power storage system 1 according to the first exemplary embodiment. In the present basic operation sequence example, the number of series connections of cells is set to two for the sake of simplicity of explanation. In a first state shown in FIG. 3(a), controller 13 controls first switch S1, first clamp switch Sc1, fourth clamp switch Sc4, and fourth switch S4 to a conducting state, and controls fifth switch S5, second clamp switch Sc2, and third clamp switch Sc3 to a non-conducting state to create a discharge path. In this discharge state, a current flows from first cell C1 to inductor L1, and the energy discharged from first cell C1 is stored in inductor L1.

Figure 3:
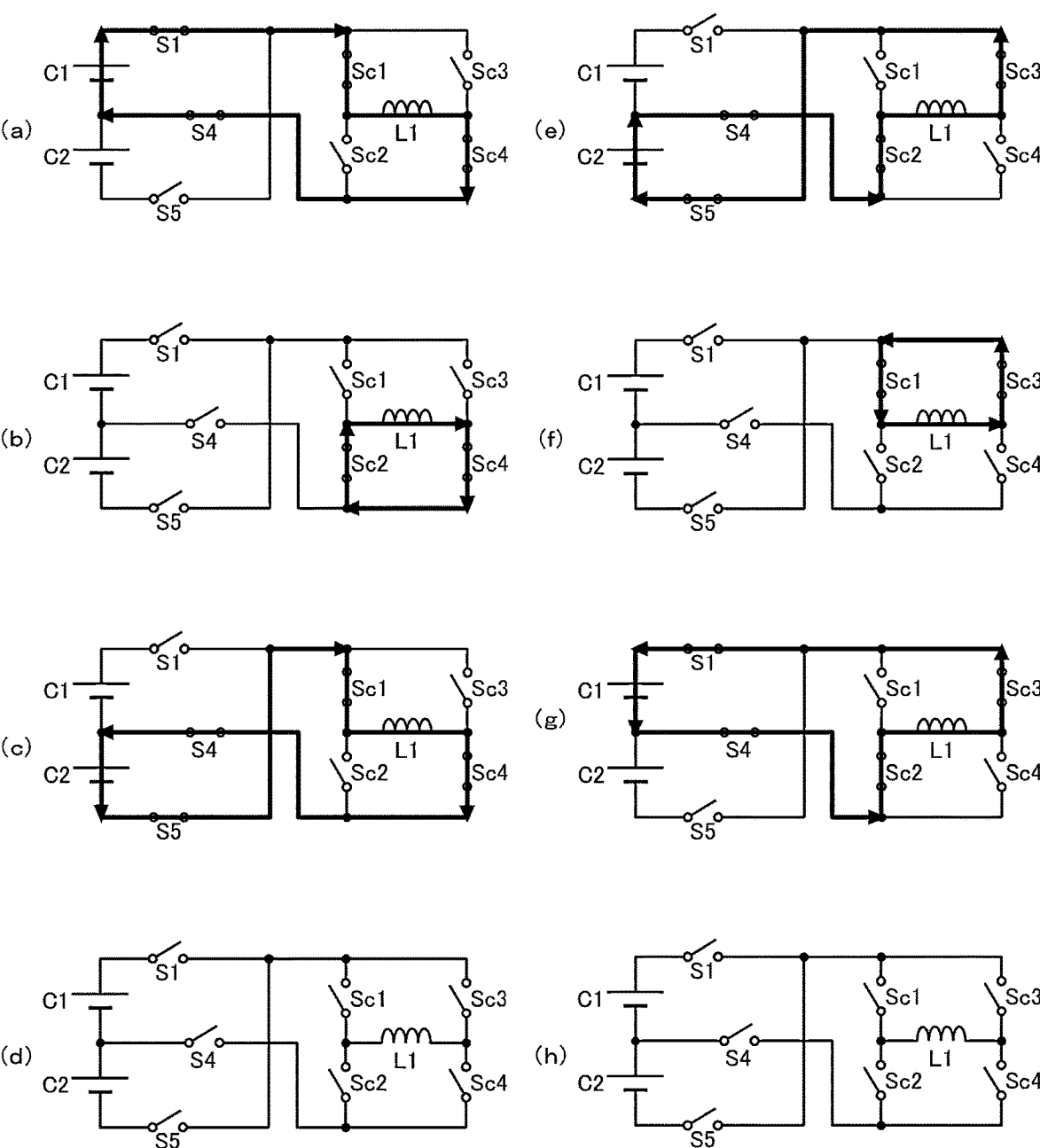
FIG. 3 is circuit diagrams for explaining a basic operation sequence example of an equalizing process of the power storage system according to the first exemplary embodiment.

In a second state shown in FIG. 3(b), controller 13 controls second clamp switch Sc2 and fourth clamp switch Sc4 to a conducting state, and controls first switch S1, fourth switch S4, fifth switch S5, first clamp switch Sc1, and third clamp switch Sc3 to a non-conducting state to create a clamp path. In this clamp state, the energy stored in inductor L1 flows as the inductor current in the closed loop and is actively clamped.

In a third state shown in FIG. 3(c), controller 13 controls fourth clamp switch Sc4, fourth switch S4, fifth switch S5, and first clamp switch Sc1 to a conducting state, and controls first switch S1, second clamp switch Sc2, and third clamp switch Sc3 to a non-conducting state to create a charge path. In this charge state, the inductor current actively clamped in the closed loop flows to second cell C2 to charge second cell C2.

In a fourth state shown in FIG. 3(d), controller 13 controls first switch S1, fourth switch S4, fifth switch S5, and first clamp switch Sc1 to fourth clamp switch Sc4 to a non-conducting state. In this state, the energy transfer from first cell C1 to second cell C2 is completed. The description performed so far is the description of a mode in which the current of inductor L1 is not inverted (a mode in which the current is not commutated). When the discharge from second cell C2 is started simultaneously with the completion of the charge of second cell C2 (commutation mode), the fourth state shown in FIG. 3(d) is omitted. The current of inductor L1 is zero at the moment of commutation, and the state is changed from FIG. 3(c) to FIG. 3(e) in which the current of inductor L1 is inverted.

In a fifth state shown in FIG. 3(e), controller 13 controls fourth switch S4, second clamp switch Sc2, third clamp switch Sc3, and fifth switch S5 to a conducting state, and controls first switch S1, first clamp switch Sc1, and fourth clamp switch Sc4 to a non-conducting state to create a discharge path. In this discharge state, a current flows from second cell C2 to inductor L1, and the energy discharged from second cell C2 is stored in inductor L1.

In a sixth state shown in FIG. 3(f), controller 13 controls first clamp switch Sc1 and third clamp switch Sc3 to a conducting state, and controls first switch S1, fourth switch S4, fifth switch S5, second clamp switch Sc2, and third clamp switch Sc3 to a non-conducting state to create a clamp path. In this clamp state, the energy stored in inductor L1 flows as the inductor current in the closed loop and is actively clamped.

In a seventh state shown in FIG. 3(g), controller 13 controls third clamp switch Sc3, first switch S1, fourth switch S4, and second clamp switch Sc2 to a conducting state, and controls fifth switch S5, first clamp switch Sc1, and fourth clamp switch Sc4 to a non-conducting state to create a charge path. In this charge state, the inductor current actively clamped in the closed loop flows to first cell C1 to charge first cell C1.

In an eighth state shown in FIG. 3(h), controller 13 controls first switch S1, fourth switch S4, fifth switch S5, and first clamp switch Sc1 to fourth clamp switch Sc4 to a non-conducting state. In this state, the energy transfer from second cell C2 to first cell C1 is completed.

In the second state or sixth state, the inductor current is actively clamped in the closed loop to ensure the continuity of the inductor current, which enables safe and reliable switch switching of cell selection circuit 11.

FIG. 4(a) to FIG. 4(c) are diagrams for showing a specific example of the equalizing process of power storage system 1 according to the first exemplary embodiment. In this specific example, an example in which four cells C1 to C4 are connected in series is assumed. FIG. 4(a) is a diagram schematically showing voltage states of first cell C1 to fourth cell C4 before start of the equalizing process. Controller 13 calculates an average value of voltages of first cell C1 to fourth cell C4 detected by voltage detector 14, and sets the calculated average value as an equalization target voltage (hereinafter, simply referred to as a target voltage).

Controller 13 transfers energy from a cell with a voltage higher than the target voltage to a cell with a voltage lower than the target voltage. For example, energy is transferred from a cell with a highest voltage among cells with voltages higher than the target voltage (first cell C1 in FIG. 4(*a*)) to a cell with a lowest voltage among cells with voltages lower than the target voltage (fourth cell C4 in FIG. 4(*a*)).

Controller 13 determines an energy transfer amount within a range in which a transfer source cell (cell to be discharged) has a voltage equal to or higher than the target voltage and a transfer destination cell (cell to be charged) has a voltage less than or equal to the target voltage. Controller 13 determines a discharge time of the transfer source cell and a charge time of the transfer destination cell based on the determined energy transfer amount and a discharge current and a charge current based on the design. Assuming that an energy amount consumed while the inductor current is actively clamped in energy retaining circuit 12 can be ignored, the discharge time of the transfer source cell is basically equal to the charge time of the transfer destination cell.

Figure 4:
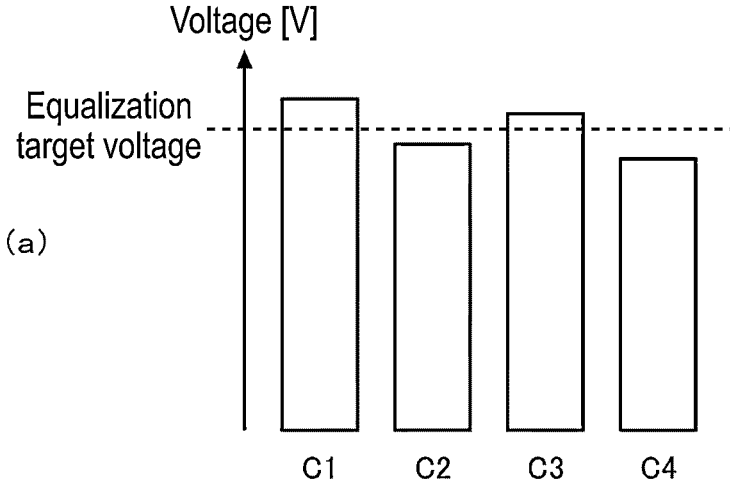
FIG. 4 is diagrams for explaining a specific example of the equalizing process of the power storage system according to the first exemplary embodiment.
Figure 4:
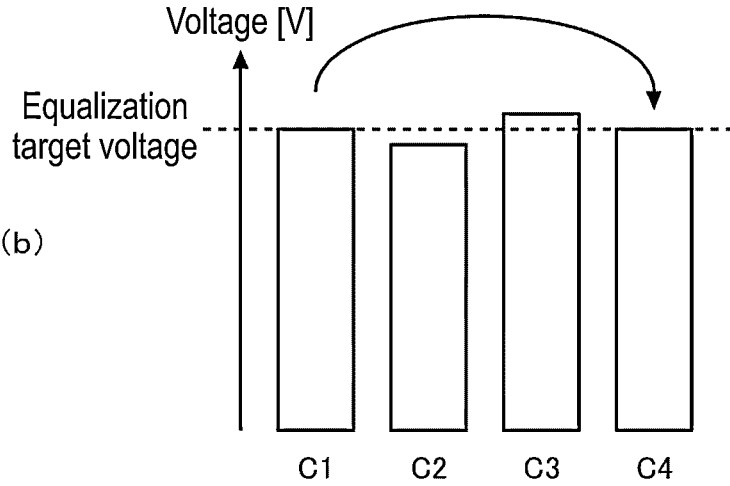
Figure 4:
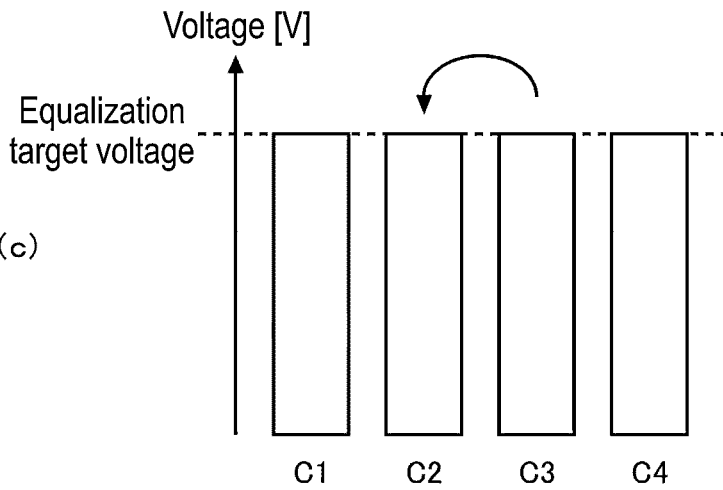

FIG. 4(*b*) illustrates a state where energy transfer from first cell C1 being the transfer source cell to fourth cell C4 being the transfer destination cell is completed. Controller 13 executes the above-described processing again. Specifically, energy is transferred from the cell with the highest voltage among cells with the voltage higher than the target voltage (third cell C3 in FIG. 4(*b*)) to the cell with the lowest voltage among cells with the voltage lower than the target voltage (second cell C2 in FIG. 4(*b*)).

FIG. 4(*c*) illustrates a state where energy transfer from third cell C3 being the source cell to second cell C2 being the destination cell is completed. As described above, the equalizing process of first cell C1 to fourth cell C4 connected in series is completed.

In the specific example shown in FIG. 4(*a*) to FIG. 4(*c*), first, the average value of the voltages of the plurality of cells connected in series is calculated, and the target value is set. In this regard, an algorithm without setting the target value is also available. At each time point, controller 13 transfers energy from the cell with the highest voltage among voltages of the plurality of cells connected in series to the cell with the lowest voltage to equalize voltages of the two cells. Controller 13 repeatedly executes this processing until the voltages of the plurality of cells connected in series are all equalized.

Further, in the above specific example, although the example of using a voltage as the equalization target value is described, an actual capacity, a dischargeable capacity, or a rechargeable capacity may be used instead of the voltage.

Figure 5:
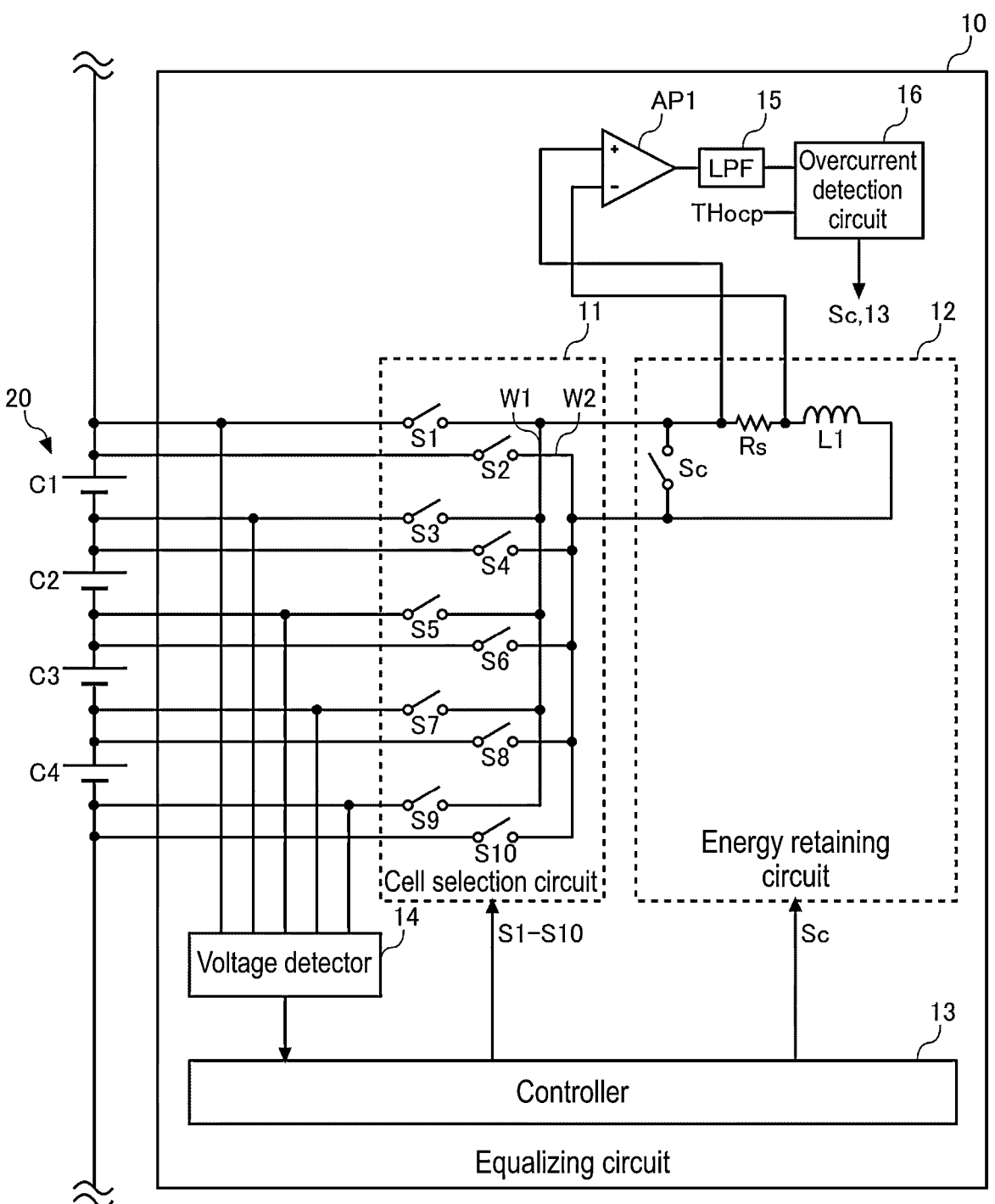
FIG. 5 is a diagram showing a configuration example 1 of a power storage system according to a second exemplary embodiment.

FIG. 5 is a diagram showing the configuration example 1 of power storage system 1 according to a second exemplary embodiment. In the second exemplary embodiment, cell selection circuit 11 includes first wiring W1 connected to a first end of inductor L1, second wiring W2 connected to a second end of inductor L1, (n+1) first wiring side switches, and (n+1) second wiring side switches. The (n+1) first wiring side switches are connected between the respective nodes of the n cells connected in series and first wiring W1. The (n+1) second wiring side switches are connected between respective nodes of the n cells connected in series and second wiring W2.

Energy retaining circuit 12 (also referred to as a clamp circuit) includes inductor L1 and clamp switch Sc. Clamp switch Sc is a switch for electrically connecting both ends of inductor L1 in energy retaining circuit 12. Energy retaining circuit 12 can form a closed loop including inductor L1 in a state where cell selection circuit 11 does not select any cells. That is, when clamp switch Sc is controlled to an ON state, a closed loop including inductor L1 and clamp switch Sc, that is, a clamp path is formed. In the second exemplary embodiment, paths (discharge path and charge path) through which energy is transferred between the selected cell and inductor L1 are formed by one predetermined first wiring side switch and one predetermined second wiring side switch. However, since energy retaining circuit 12 does not have a function of switching a direction of a current flowing through inductor L1, the discharge path and the charge path are formed by selecting the first wiring side switch and the second wiring side switch for switching the state to the conducting state according to the direction of the current flowing through inductor L1.

When transferring energy between cells, controller 13 controls clamp switch Sc1 to be in a conducting state, and also controls cell selection circuit 11 to conduct both ends of the cell to be discharged among the n cells and both ends of inductor L1 for a predetermined time to create a discharge path. In a state where the discharge path is created, a current flows between the cell to be discharged and inductor L1, and a state where a current flows from the cell to be discharged to inductor L1 (also referred to as an inductor increase state) occurs, and energy is stored in inductor L1.

Next, controller 13 controls cell selection circuit 11 to electrically cut off the n cells and inductor L1 and controls clamp switch Sc to be in a conducting state to create a clamp path. In this clamp state, a circulating current flows through the closed loop, and an inductor current is actively clamped in energy retaining circuit 12.

Next, controller 13 controls clamp switch Sc in a conducting state and controls cell selection circuit 11 to electrically connect both ends of a cell to be charged among the n cells and both ends of inductor L1 for a predetermined time to create a charge path. In a state where the charge path is created, a current flows between the cell to be charged and inductor L1, and a state where an inductor current actively clamped in energy retaining circuit 12 flows in the cell to be charged (also referred to as an inductor current reduction state) occurs. Accordingly, the energy transfer from one cell to another is completed.

The configuration of the overcurrent protection unit is the same as the configuration example 1 of the first exemplary embodiment shown in FIG. 1.

Figure 6:
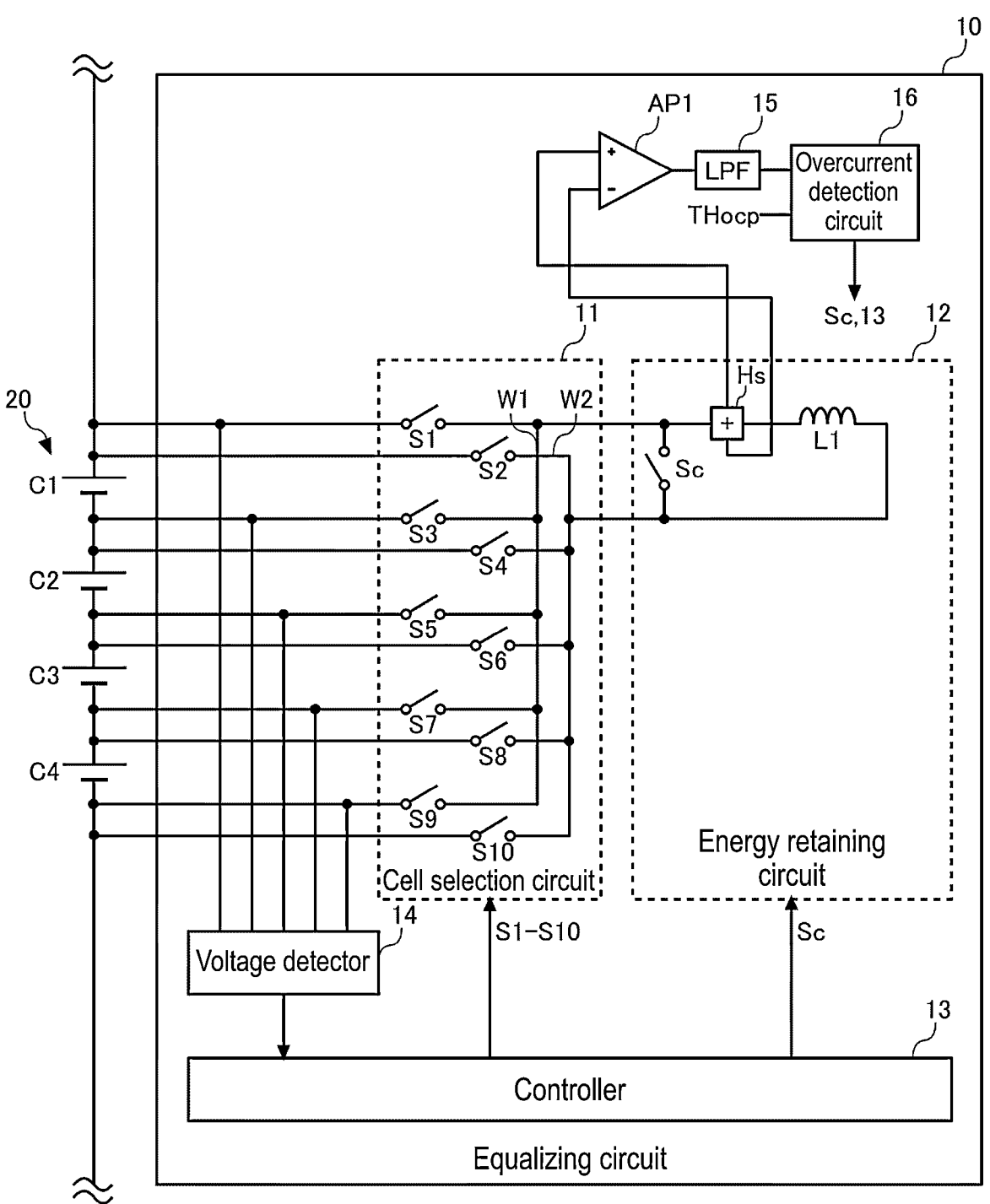
FIG. 6 is a diagram showing a configuration example 2 of the power storage system according to the second exemplary embodiment.

FIG. 6 is a diagram showing the configuration example 2 of power storage system 1 according to the second exemplary embodiment. The configuration example 2 shown in FIG. 6 differs from the configuration example 1 shown in FIG. 5 in the configuration of the overcurrent detector. In the configuration example 2, Hall element Hs is included instead of shunt resistor Rs. Hall element Hs generates a voltage corresponding to the current flowing through inductor L1 by applying a magnetic field in the vertical direction to the current flowing through inductor L1. Subsequent configurations are the same as the configuration example 1.

Figure 7:
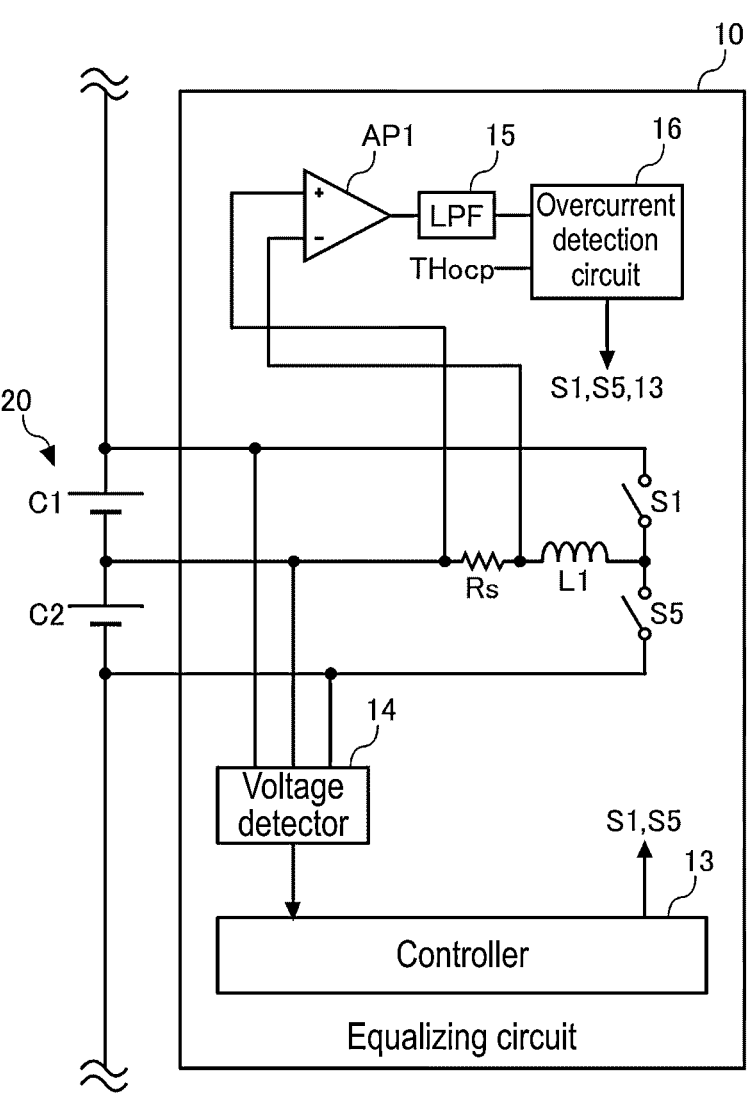
FIG. 7 is a diagram illustrating a configuration example of a power storage system according to a comparative example.

FIG. 7 is a diagram illustrating the configuration example of power storage system 1 according to the comparative example. In the comparative example, power storage 20 includes two cells C1, C2 connected in series. In the comparative example, the energy transfer of two cells C1, C2 can be achieved only by providing two switches S1 and S5. In the comparative example, the state of clamping the current does not occur.

Hereinafter, cutoff frequency fc of low-pass filter 15 will be described. Cutoff frequency fc ($=\frac{1}{2\pi\tau}$) of low-pass filter 15 has a unique relationship with time constant $\tau$ ($=$RC) of low-pass filter 15.

Figure 8:
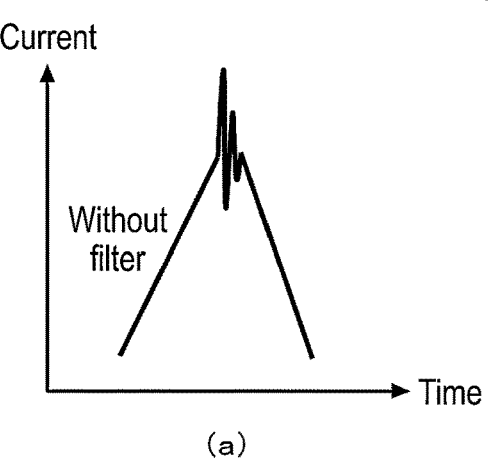
FIG. 8 is diagrams in which a schematic waveform of an inductor current input to the overcurrent detection circuit according to the comparative example, and a schematic waveform of an inductor current input to the overcurrent detection circuit according to the first exemplary embodiment and the second exemplary embodiment are compared.
Figure 8:
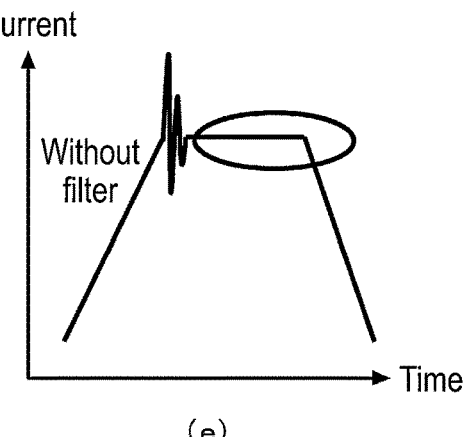
Figure 8:
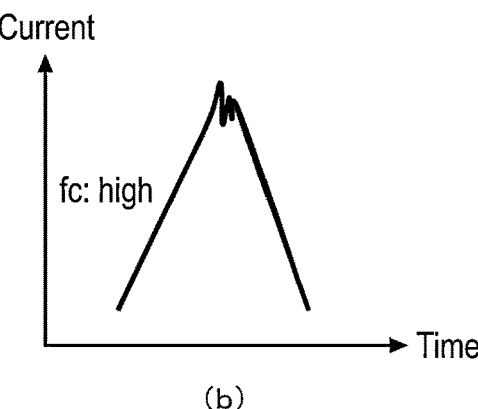
Figure 8:
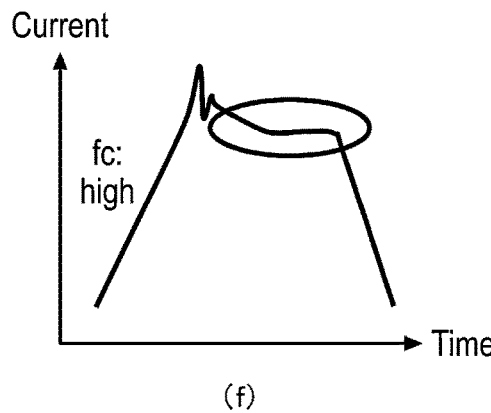
Figure 8:
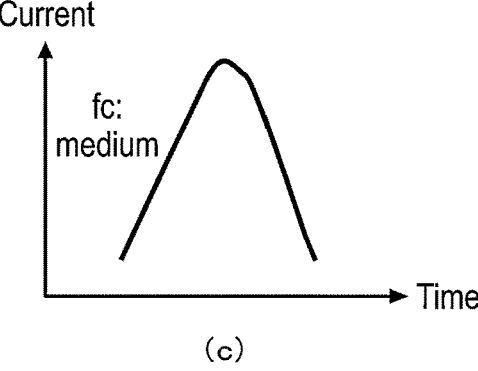
Figure 8:
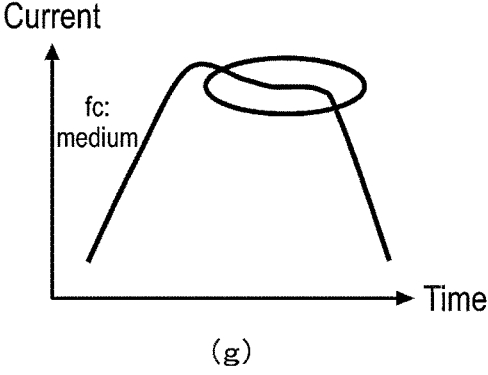
Figure 8:
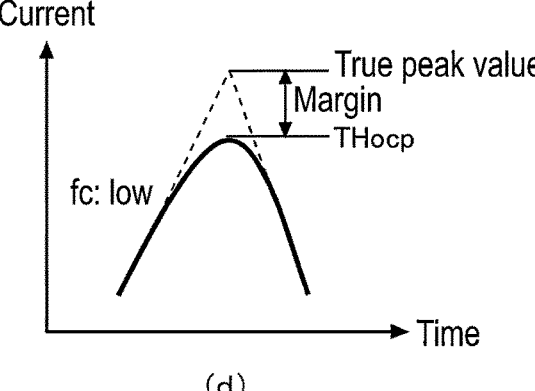
Figure 8:
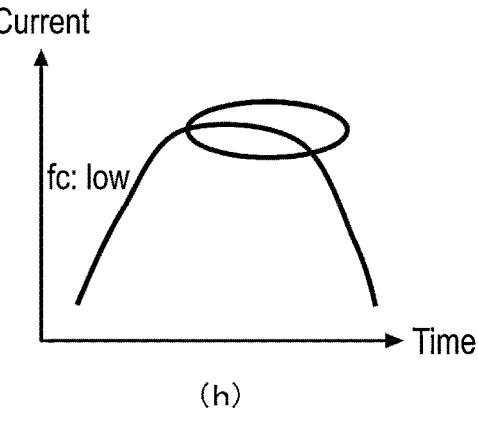

FIG. 8(*a*) to FIG. 8(*h*) are diagrams in which a schematic waveforms of the inductor current input to the overcurrent detection circuit 16 according to the comparative example, and a schematic waveform of the inductor current input to the overcurrent detection circuit 16 according to the first exemplary embodiment and the second exemplary embodiment are compared. FIG. 8(a) to FIG. 8(d) show a schematic waveform of the inductor current input to overcurrent detection circuit 16 according to the comparative example. When the inductor current switches from an increase to a decrease due to the turn-off of the switch provided on the path connecting the discharge cell and inductor L1, the high frequency ringing noise is generated due to the parasitic capacitance and the parasitic inductance of the substrate.

The current waveform shown in FIG. 8(a) shows a current waveform when it does not pass through low-pass filter 15. The ringing noise is superimposed on the peak of the current waveform. The current waveform shown in FIG. 8(b) shows a current waveform that has passed through low-pass filter 15 in which cutoff frequency fc is set to a high value. The current waveform shown in FIG. 8(c) shows a current waveform that has passed through low-pass filter 15 in which cutoff frequency fc is set to a medium value. The current waveform shown in FIG. 8(d) shows a current waveform that has passed through low-pass filter 15 in which cutoff frequency fc is set to a low value.

In the current waveform shown in FIG. 8(d), since cutoff frequency fc is set to a low value, the ringing noise generated at the peak of the current waveform is removed. However, since the current waveform itself to be detected also becomes blunt, it is not possible to accurately grasp the true peak value. When overcurrent protection threshold THocp is set near the peak of the current waveform blunted by low-pass filter 15, the deviation between the true peak value and overcurrent protection threshold THocp is large.

On the other hand, when cutoff frequency fc is set to a high value as shown in the current waveform shown in FIG. 8(b), the ringing noise is not completely removed, and the current in the normal range due to the instantaneous ringing noise may be falsely detected as an overcurrent. In order to prevent this false detection, it is necessary to set cutoff frequency fc to a low value as shown in the current waveform shown in FIG. 8(d), but the lower cutoff frequency fc is set, the larger the wasteful design margin is. Overcurrent protection will be activated when there is the surplus for the capacity in which inductor L1 passes current, so that inductor L1 will not be able to fully demonstrate its capacity. In other word, inductor L1 and other elements that have excessive capacities for the originally required capacity are used, and equalizing circuit 10 is large and costly. Specifically, increasing the size of inductor L1 leads to increasing the size of entire equalizing circuit 10.

FIG. 8(e) to FIG. 8(h) show a schematic waveform showing an inductor current input to overcurrent detection circuit 16 according to the first exemplary embodiment and the second exemplary embodiment. In the first exemplary embodiment and the second exemplary embodiment, the inductor current is clamped near the peak value by energy retaining circuit 12 without decreasing immediately after the inductor current reaches the peak value. In order to prevent the false detection, as shown in FIG. 8(h), even when low-pass filter 15 with cutoff frequency fc with sufficiently suppressed ringing noise is used as shown in the current waveform, appropriate overcurrent protection can be applied. That is, since the peak value is clamped by energy retaining circuit 12, the peak value of the inductor current in which ringing noise is suppressed can be compared with overcurrent protection threshold THocp, and appropriate overcurrent protection can be applied.

In the first exemplary embodiment and the second exemplary embodiment, since the peak value of the inductor current can be maintained for a certain period of time, it is not necessary to set the time constant of low-pass filter 15 excessively, and the time constant can be set to the optimal value. Further, since the deviation between the true peak value and overcurrent protection threshold THocp is small, the design margin can be reduced, and equalizing circuit 10 can be prevented from becoming unnecessarily large and costly.

Figures 9, 10:
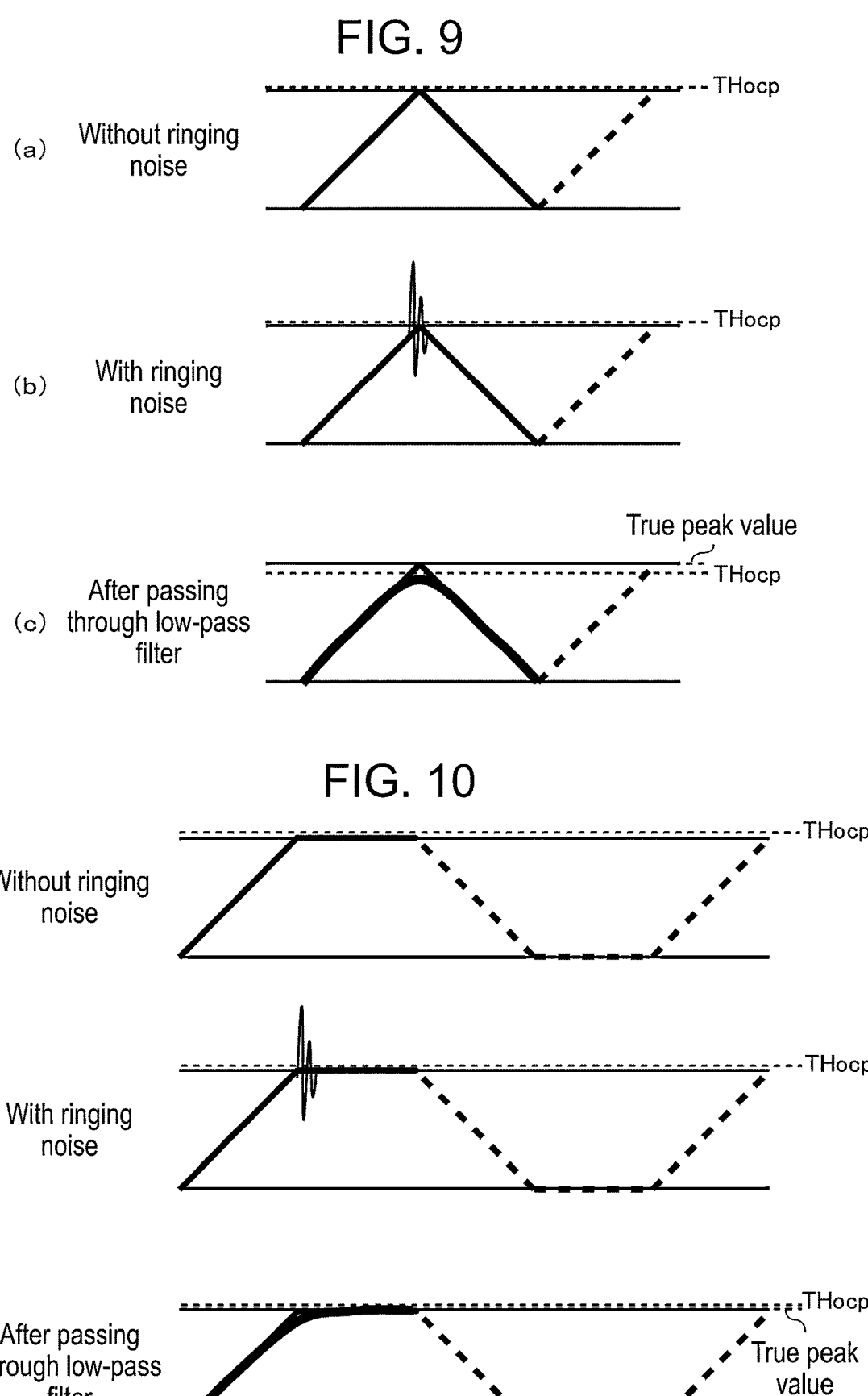
FIG. 9 is diagrams showing an example of a detection waveform of an inductor current according to the comparative example.
FIG. 10 is diagrams showing an example of a detection waveform of an inductor current according to the first exemplary embodiment and the second exemplary embodiment.

FIG. 9(a) to FIG. 9(c) are diagrams showing an example of the detection waveform of the inductor current according to the comparative example. FIG. 9(a) shows a current waveform in which the ringing noise is not superimposed, FIG. 9(b) shows a current waveform in which the ringing noise is superimposed, and FIG. 9(c) shows a current waveform after passing through low-pass filter 15. When ringing noise is superimposed as shown in FIG. 9(b), even when the inductor current itself is within the normal range, it is falsely detected as an overcurrent. As shown in FIG. 9(c), when low-pass filter 15 in which cutoff frequency fc is set to a low value is provided, the deviation between the true peak value of the inductor current and overcurrent protection threshold THocp is large, so that the wasteful design margin is generated. Specifically, inductor L1 is unnecessarily large.

FIG. 10(a) to FIG. 10(c) are diagrams showing an example of the detection waveform of the inductor current according to the first exemplary embodiment and the second exemplary embodiment. FIG. 10(a) shows a current waveform in which ringing noise is not superimposed, FIG. 10(b) shows a current waveform in which ringing noise is superimposed, and FIG. 10(c) shows a current waveform after passing through low-pass filter 15. In the first exemplary embodiment and the second exemplary embodiment, as shown in FIG. 10(c), even when low-pass filter 15 in which cutoff frequency fc is set to a low value is provided, the deviation between the true peak value of the inductor current and overcurrent protection threshold THocp is small, so that the design margin is optimized. Specifically, it is possible to prevent inductor L1 from becoming unnecessarily large.

An example of setting cutoff frequency fc of low-pass filter 15 will be described below. Cutoff frequency fc of low-pass filter 15 is required to be set to a value which allows the suppression of the inductor current itself to be small while suppressing the ringing noise.

Hereinafter, the experimental results observed by an oscilloscope after measuring both ends of shunt resistor Rs with a current probe while changing cutoff frequency fc of low-pass filter 15 are shown. The measurement is performed with the resistance value of shunt resistor Rs of 1Ω, and drive frequency fsw of clamp switch Sc of 300 kHz.

Figure 11:
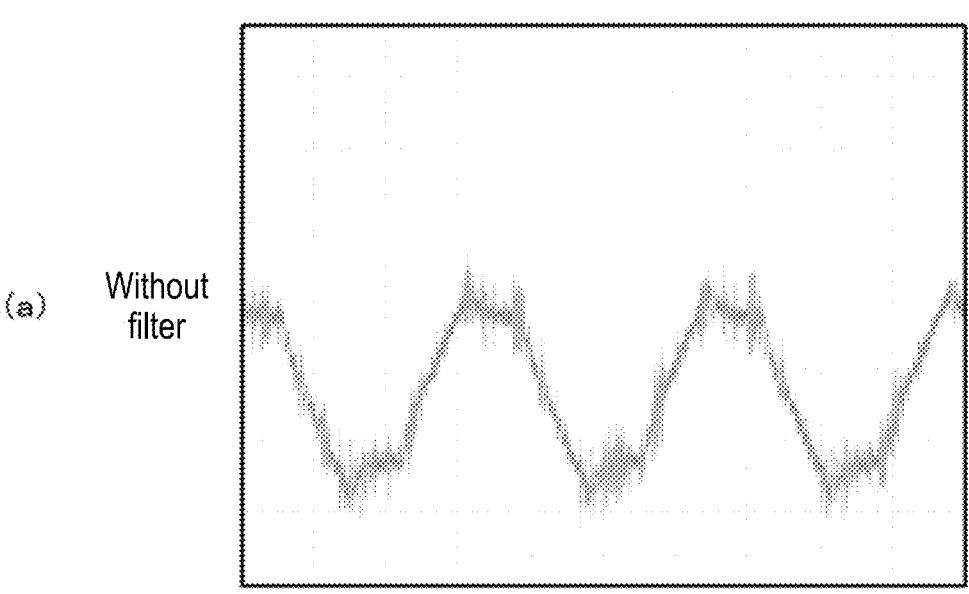
FIG. 11 is diagrams showing a detection waveform of an inductor current that has not passed through the low-pass filter and a detection waveform of an inductor current that has passed through the low-pass filter with the cutoff frequency set to 20 MHz.
Figure 11:
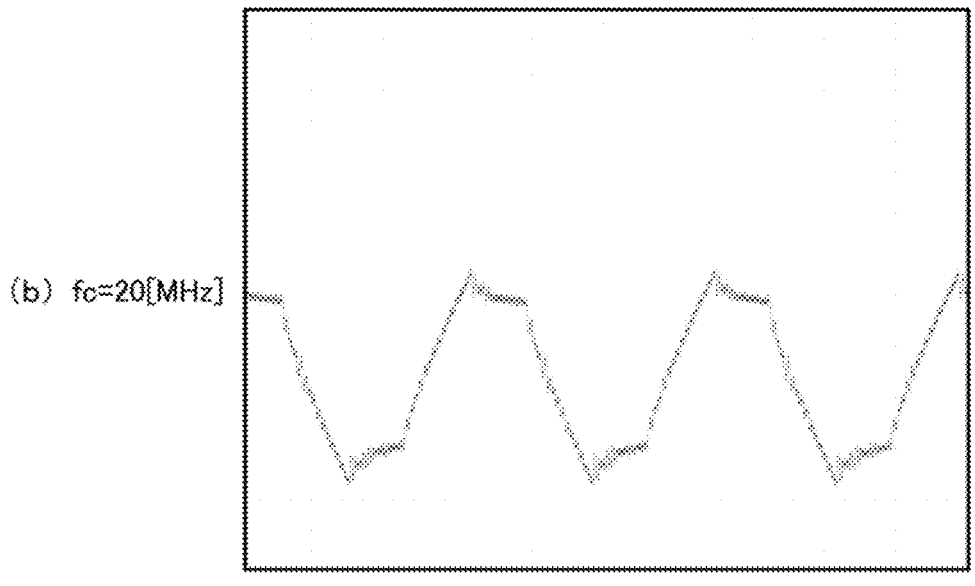
Figure 12:
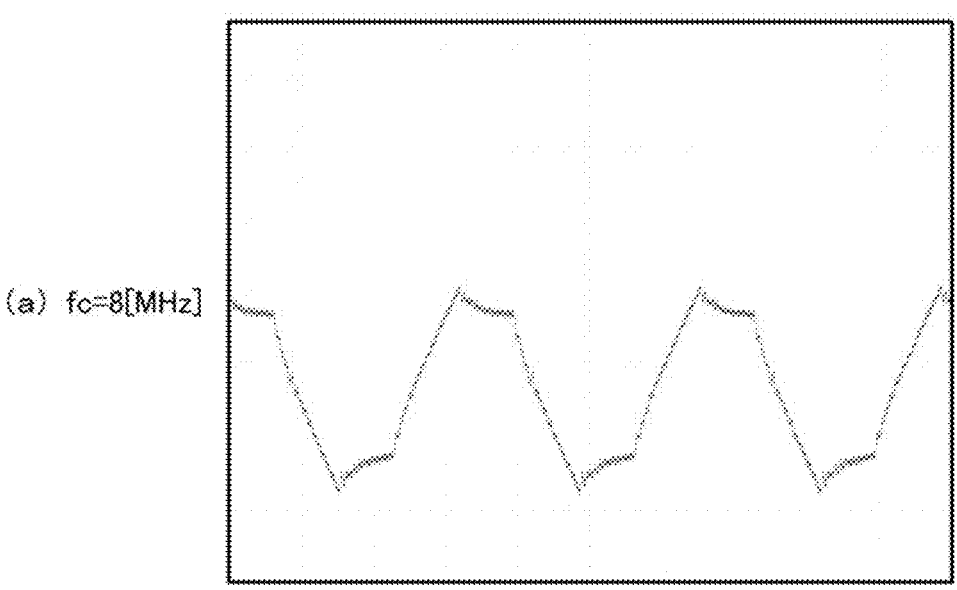
FIG. 12 is diagrams showing a detection waveform of an inductor current that passed through the low-pass filter with the cutoff frequency set to 8 MHz and a detection waveform of an inductor current that passed through the low-pass filter with the cutoff frequency set to 4 MHz.
Figure 12:
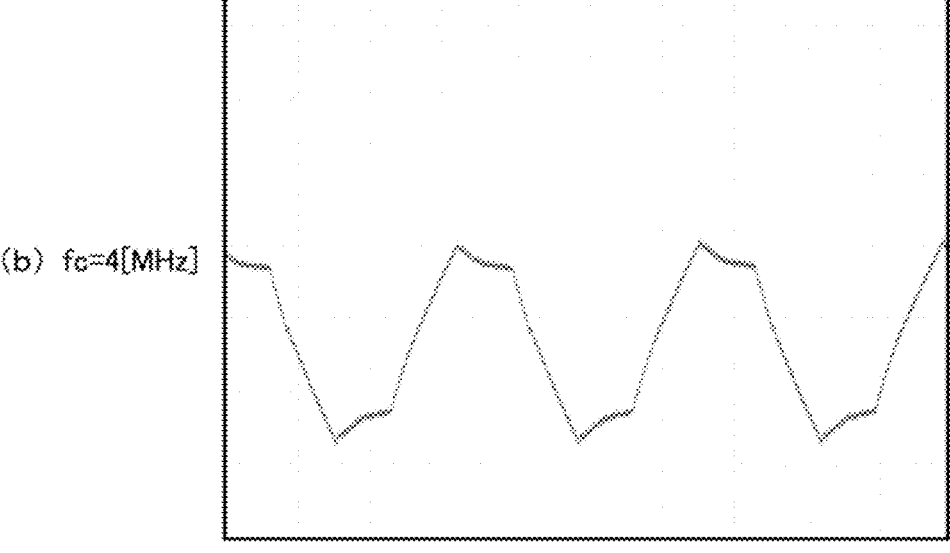
Figure 13:
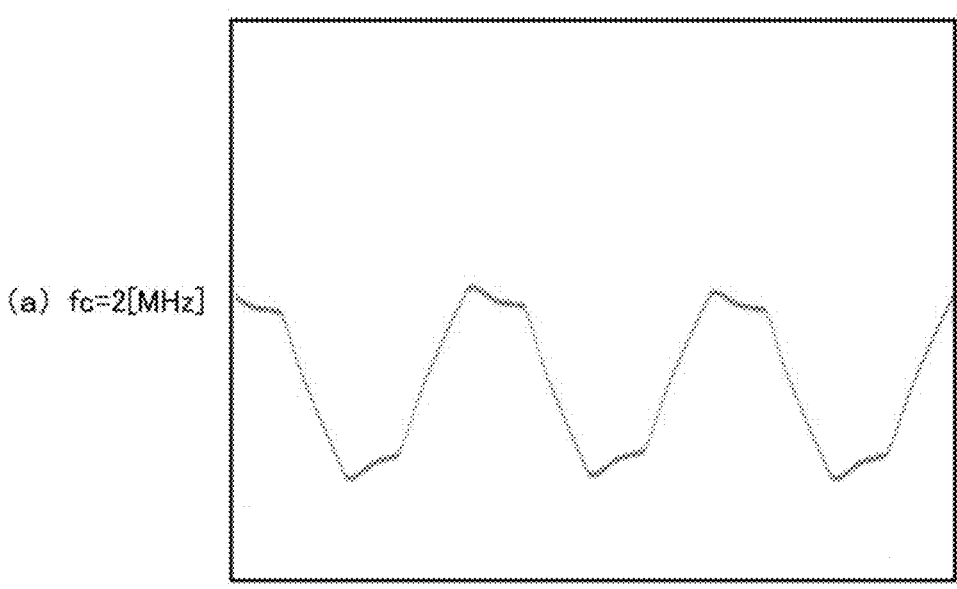
FIG. 13 is diagrams showing a detection waveform of an inductor current that passed through the low-pass filter with the cutoff frequency set to 2 MHz and a detection waveform of an inductor current that passed through the low-pass filter with the cutoff frequency set to 1 MHz.
Figure 13:
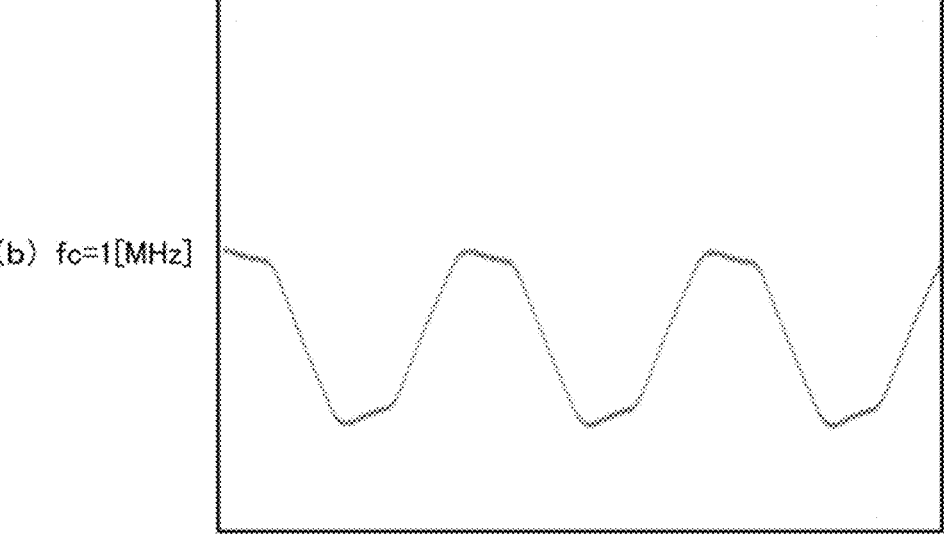
Figure 14:
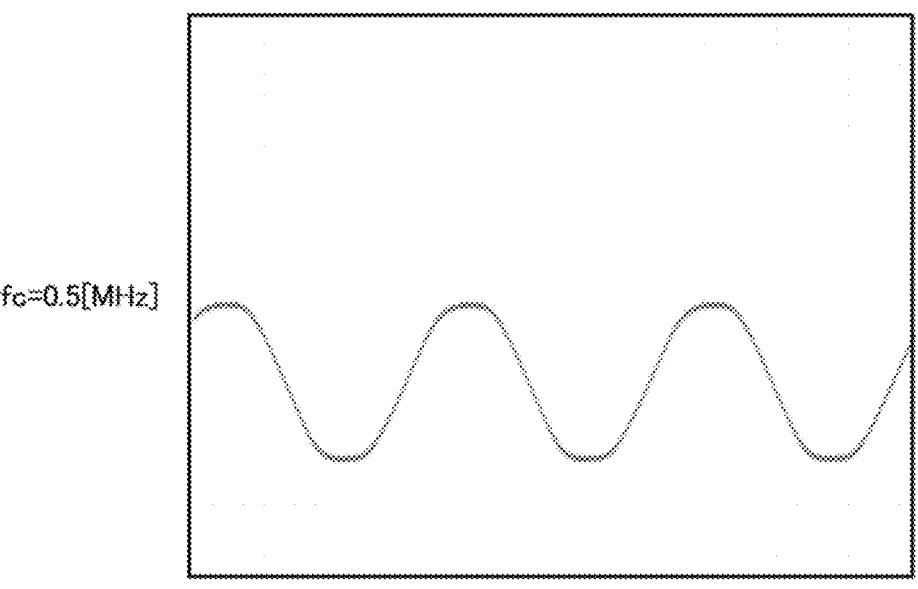
FIG. 14 is a diagram showing a detection waveform of an inductor current that has passed through low-pass filter 15 with the cutoff frequency set to 0.5 MHz.

FIG. 11(a) to FIG. 11(b) are diagrams showing a detection waveform of an inductor current that has not passed through low-pass filter 15 and a detection waveform of an inductor current that has passed through low-pass filter 15 with cutoff frequency fc set to 20 MHz. FIG. 12(a) to FIG. 12(b) are diagrams showing a detection waveform of an inductor current that passed through low-pass filter 15 with cutoff frequency fc set to 8 MHz and a detection waveform of an inductor current that passed through low-pass filter 15 with cutoff frequency fc set to 4 MHz. FIG. 13(a) to FIG. 13(b) are diagrams showing a detection waveform of an inductor current that passed through low-pass filter 15 with cutoff frequency fc set to 2 MHz and a detection waveform of an inductor current that passed through low-pass filter 15 with cutoff frequency fc set to 1 MHz. FIG. 14 is a diagram showing a detection waveform of an inductor current that has passed through low-pass filter 15 with cutoff frequency fc set to 0.5 MHz.

Of these current waveforms, the current detection waveform shown in FIG. 12(b) and the current detection waveform shown in FIG. 13(a) can be said to be current waveforms which allows the suppression of the inductor current itself to be small while suppressing the ringing noise. When using low-pass filter 15 with cutoff frequency fc=3 MHz between cutoff frequency fc=4 MHz in FIG. 12(b) and cutoff frequency fc=2 MHz in FIG. 13(a), the relationship between drive frequency fsw of clamp switch Sc and cutoff frequency fc of low-pass filter 15 is as follows (Equation 1).

$$fsw:fc=300 \text{ kHz}:3 \text{ MHz}=1:10 \qquad \text{(Equation 1)}$$

Based on the above experimental results, when cutoff frequency fc of low-pass filter 15 is set to 10 times or more of drive frequency fsw of clamp switch Sc, a desirable current waveform that allows the suppression of the inductor current itself to be small while suppressing the ringing noise is obtained. The magnification of cutoff frequency fc of low-pass filter 15 with respect to drive frequency fsw of clamp switch Sc is preferably set to 10 times or more, but is not limited to this, and may be set to be more than or equal to a predetermined multiple at least greater than one in some cases, and may be set according to the effect of suppressing the ringing noise and the degree of suppression of the inductor current.

Next, the experimental results of observing the simulated waveform of the ringing noise generated by a waveform generator with an oscilloscope while changing cutoff frequency fc of low-pass filter 15 are shown. In this experiment, a simulated waveform of the ringing noise with ringing frequency fr=1.25 MHz is used.

Figure 15:
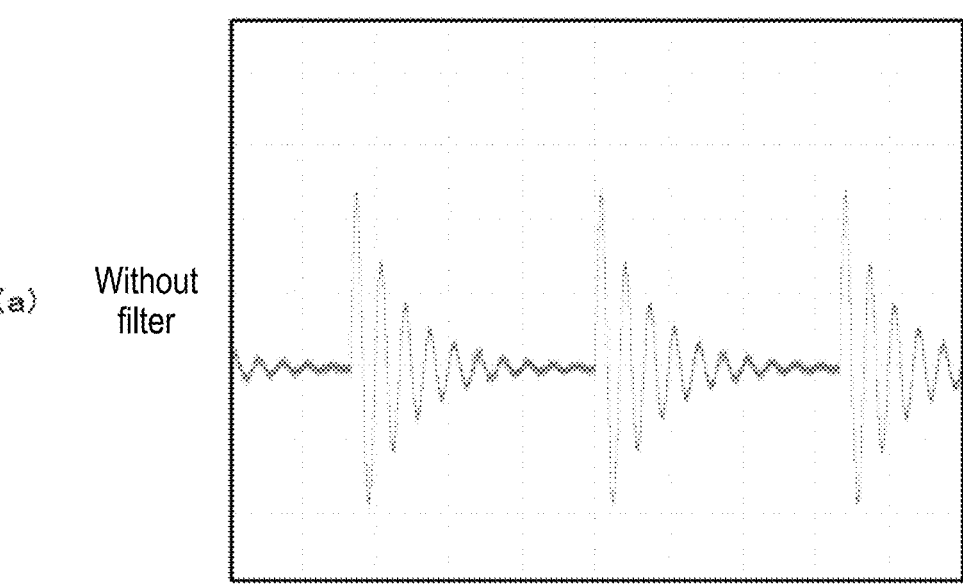
FIG. 15 is diagrams showing a detection waveform of a ringing noise that has not passed through the low-pass filter and a detection waveform of a ringing noise that has passed through the low-pass filter with the cutoff frequency set to 20 MHz.
Figure 15:
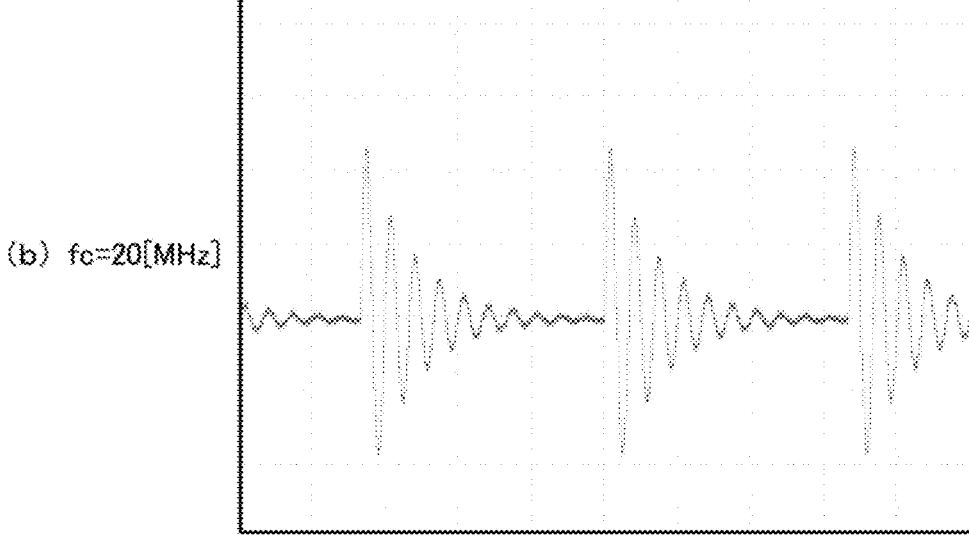
Figure 16:
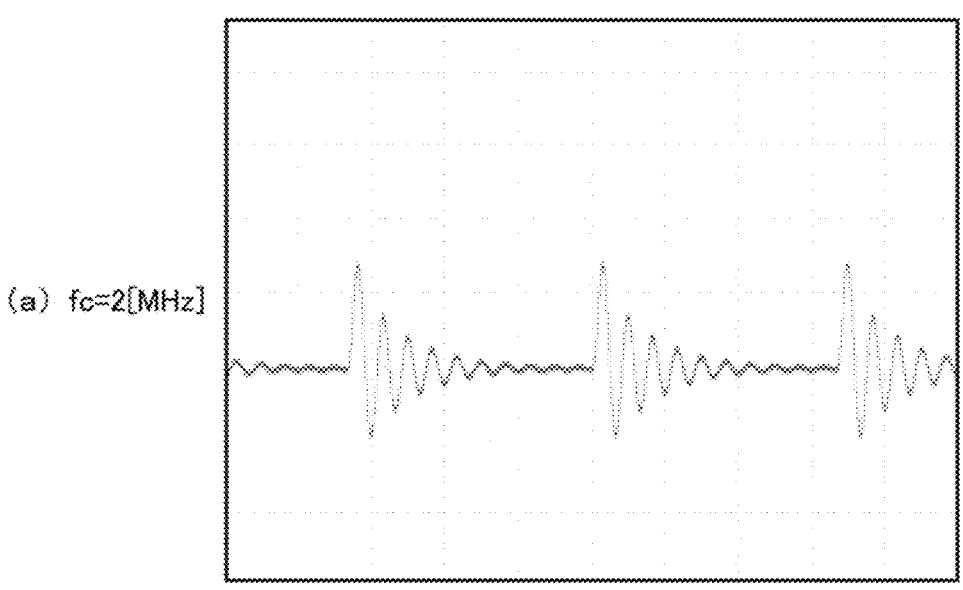
FIG. 16 is diagrams showing a detection waveform of a ringing noise that passed through the low-pass filter with the cutoff frequency set to 2 MHz and a detection waveform of a ringing noise that passed through the low-pass filter with the cutoff frequency set to 1 MHz.
Figure 16:
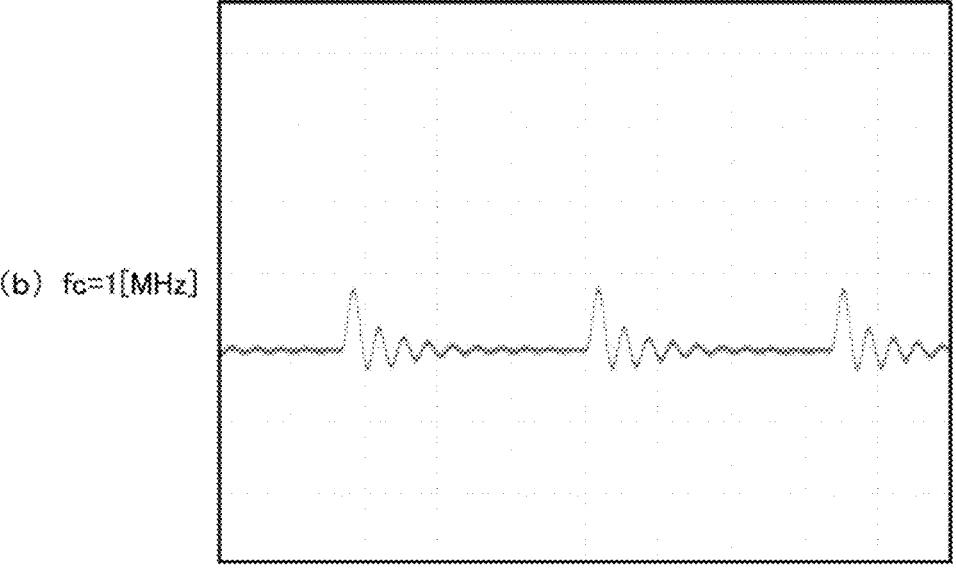
Figure 17:
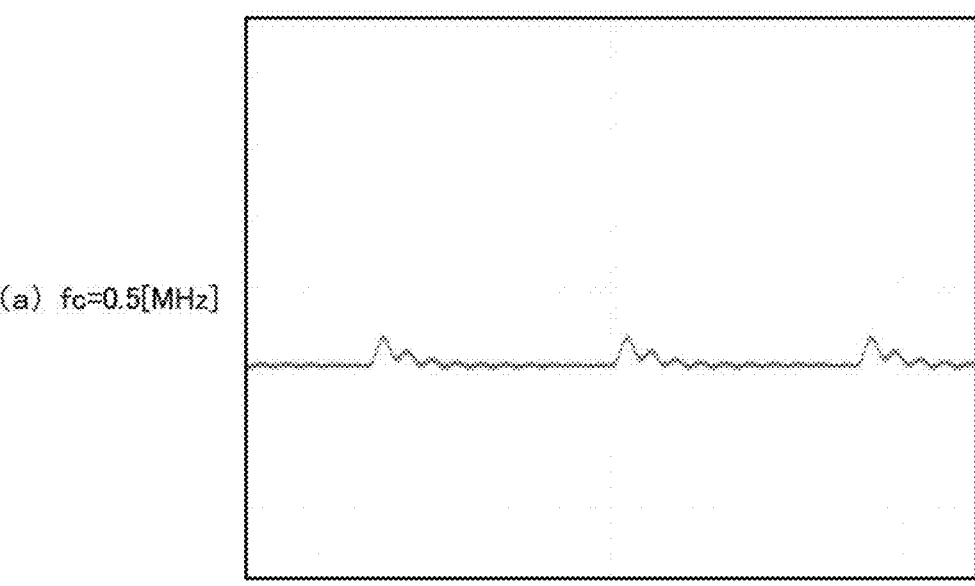
FIG. 17 is diagrams showing a detection waveform of a ringing noise that passed through the low-pass filter with the cutoff frequency set to 0.5 MHz and a detection waveform of a ringing noise that passed through the low-pass filter with the cutoff frequency set to 0.25 MHz.
Figure 17:
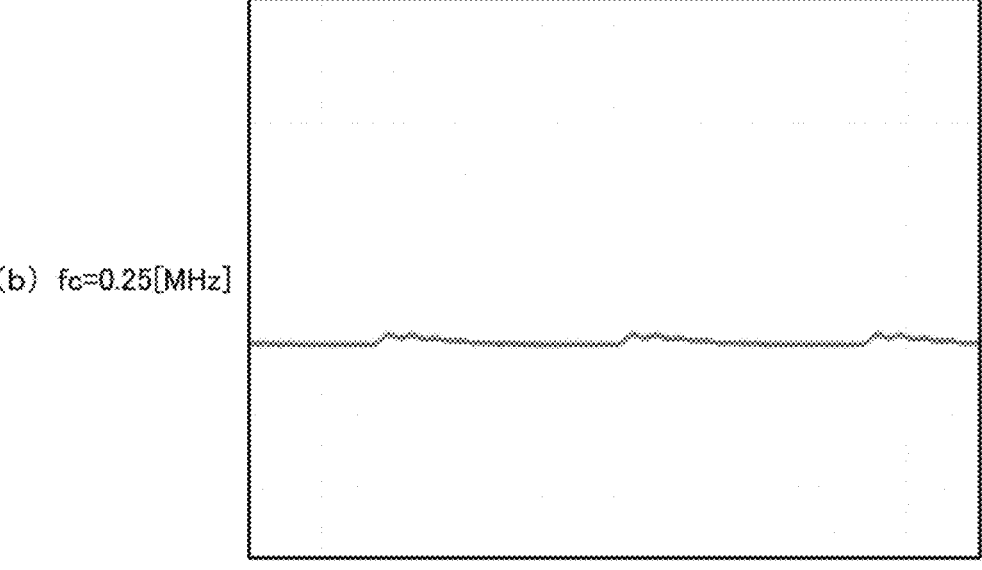
Figure 18:
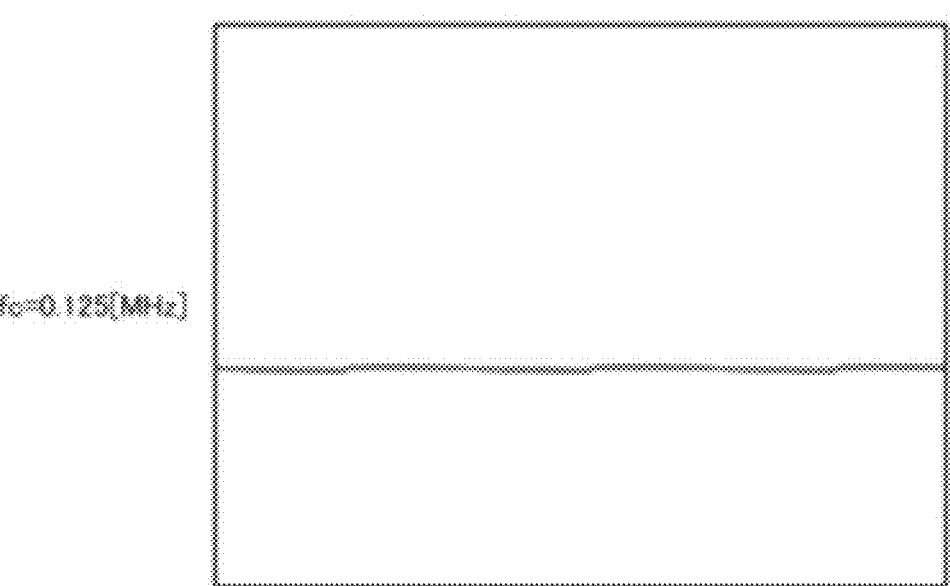
FIG. 18 is a diagram showing a detection waveform of a ringing noise that has passed through the low-pass filter with the cutoff frequency set to 0.125 MHz.

FIG. 15(a) to FIG. 15(b) are diagrams showing a detection waveform of a ringing noise that has not passed through low-pass filter 15 and a detection waveform of a ringing noise that has passed through low-pass filter 15 with cutoff frequency fc set to 20 MHz. FIG. 16(a) to FIG. 16(b) diagrams showing a detection waveform of a ringing noise that passed through low-pass filter 15 with cutoff frequency fc set to 2 MHz and a detection waveform of a ringing noise that passed through low-pass filter 15 with cutoff frequency fc set to 1 MHz. FIG. 17(a) to FIG. 17(b) diagrams showing a detection waveform of a ringing noise that passed through low-pass filter 15 with cutoff frequency fc set to 0.5 MHz and a detection waveform of a ringing noise that passed through low-pass filter 15 with cutoff frequency fc set to 0.25 MHz. FIG. 18 is a diagram showing a detection waveform of a ringing noise that has passed through low-pass filter 15 with cutoff frequency fc set to 0.125 MHz.

When the relationship between ringing frequency fr and cutoff frequency fc is 1:1, the amount of attenuation of low-pass filter 15 is −3 dB ($1/\sqrt{2}$). When the relationship between ringing frequency fr and cutoff frequency fc is 10:1, the amount of attenuation of low-pass filter 15 is −20 dB ($1/10$). When the relationship between ringing frequency fr and cutoff frequency fc is 100:1, the amount of attenuation of low-pass filter 15 is −40 dB ($1/100$).

The ringing noise does not necessarily have to be completely eliminated, and may be suppressed to a negligible level in the detection of the inductor current. In the detection waveform shown in FIG. 18, it can be said that the ringing noise is suppressed to a negligible level. From the above experimental results, as shown in the following (Equation 2), when cutoff frequency fc of low-pass filter 15 is set to $1/10$ or less of ringing frequency fr, the ringing noise can be suppressed to a negligible level. The magnification of cutoff frequency fc of low-pass filter 15 with respect to ringing frequency fr is preferably set to $1/10$ or less, but is not limited to this, and may be set to less than or equal to a predetermined multiple at least less than one in some cases, and may be set according to the effect of suppressing the ringing noise and the degree of suppression of the inductor current.

$$fr:fc=1.25 \text{ MHz}:0.125 \text{ MHz}=10:1 \qquad \text{(Equation 2)}$$

Further, in the first exemplary embodiment and the second exemplary embodiment described above, an example of equalizing a plurality of cells connected in series by an active method is described. In this regard, the equalizing circuit according to the first exemplary embodiment and the second exemplary embodiment can be used to equalize a plurality of modules connected in series. In this case, "cell" in the description of the first exemplary embodiment and the second exemplary embodiment may be appropriately read as "module".

Figure 19:
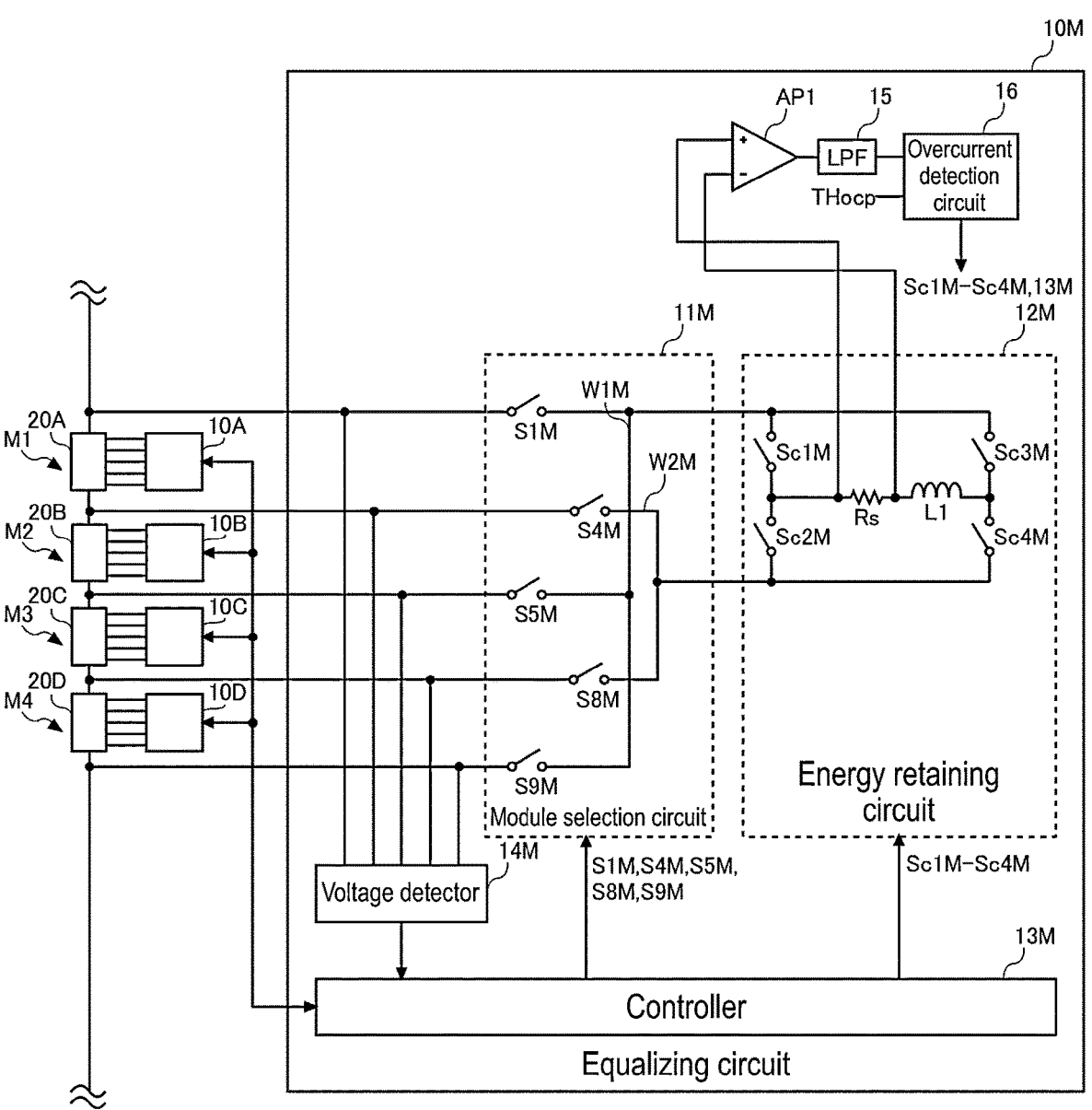
FIG. 19 is a diagram showing a configuration of a power storage system according to a third exemplary embodiment.

FIG. 19 is a diagram showing a configuration of power storage system 1M according to a third exemplary embodiment. FIG. 19 shows power storage system 1M including an equalizing circuit that executes an equalizing process on a plurality of modules connected in series. In FIG. 19, each of the plurality of modules includes a cell equalizing circuit and a power storage in which a plurality of cells is connected in series, as in power storage system 1 shown in FIG. 1. First module M1 includes cell equalizing circuit 10A and power storage 20A, second module M2 includes cell equalizing circuit 10B and power storage 20B, third module M3 includes cell equalizing circuit 10C and power storage 20C, and fourth module M4 includes cell equalizing circuit 10D and power storage 20D.

Module equalizing circuit 10M includes voltage detector 14M, module selection circuit 11M, energy retaining circuit 12M, and controller 13M.

In the present exemplary embodiment, controller 13M executes an equalizing process on m modules connected in series by an active module balance method. In the active module balance method according to the present exemplary embodiment, energy is transferred from one module (module to be discharged) to another module (module to be charged) among m modules connected in series, thereby equalizing the capacities between one module and the other module. Repeating this energy transfer equalizes the capacities of the m modules connected in series.

In addition to the above equalizing process on the plurality of modules, the equalizing process for the plurality of cells connected in series in each module is executed. The equalizing process on the plurality of cells connected in series in each module may be executed in a multiplexed manner with the equalizing process for the plurality of modules. In this case, module equalizing circuit 10M and cell equalizing circuits 10A to 10D are operated in cooperation with each other by communication. The equalizing process on the modules is preferably executed with priority over the equalizing process on the cells, and after the equalizing process on the modules is completed, the equalizing process for the cells is completed, and thereby it is possible to eliminate the voltage difference between the cells generated by executing the equalizing process on the modules.

The configuration of the overcurrent protection unit is the same as the configuration example 1 of the first exemplary embodiment shown in FIG. 1.

As described above, according to the first to third exemplary embodiments, it is possible to suppress the high frequency noise included in the detection waveform of the inductor current and achieve highly accurate overcurrent protection at an appropriate circuit scale and cost. Since the presence or absence of overcurrent is detected in the flat portion of the current waveform when the inductor current is clamped, cutoff frequency fc of low-pass filter 15 can be set to an appropriate value. This eliminates the need for a design with an excessive margin, and makes it possible to optimize the circuit scale and cost of equalizing circuit 10. Excessive specifications of components such as inductors, switches, and cells can be prevented. Moreover, since it is only necessary to optimize the time constant of the low-pass filter of a general overcurrent protection circuit, no special additional component is required.

The present disclosure is described above based on the exemplary embodiments. The exemplary embodiments are exemplified, and it is easily understood by the person of ordinary skill in the art that various modified examples are available for combinations of each of configuration elements of the examples and each of processing process thereof, and that such modified examples are also within the scope of the present disclosure.

In the above-described first to third exemplary embodiments, the equalizing circuit of the active cell balance method is described, but it can also be applied to energy transfer not intended for equalization between the plurality of cells or modules. For example, when temperatures of two modules are significantly different, at least a portion of the energy of a module having a high temperature may be transferred to a module having a low temperature in order to reduce storage degradation.

In the above-described first to third exemplary embodiments, the energy transfer from one cell to another cell is described, but energy transfer from a plurality of cells connected in series to a plurality of cells connected in series can also be executed. Energy transfer from one cell to a plurality of cells connected in series and energy from a plurality of cells connected in series to another cell can also be executed. The same applies to the modules.

Note that the exemplary embodiments may be specified by the following items.

[Item 1] Energy transfer circuit (10) including inductor (L1), cell selection circuit (11) provided between n cells (C1 to C4) connected in series, where n is an integer of 2 or more, and inductor (L1) and capable of conducting both ends of a selected cell including any one of n cells (C1 to C4) or a plurality of cells connected in series, and both ends of inductor (L1), clamp circuit (12) having at clamp switch (Sc1 to Sc4, or Sc) for forming a closed loop including inductor (L1) with cell selection circuit (11) not selecting any cells (C1 to C4), current detection circuit (Rs and AP1, or Hs and AP1) configured to detect a value of a current flowing through inductor (L1), low-pass filter (15) configured to band-limit a detection value detected by current detection circuit (Rs and AP1, or Hs and AP1), and overcurrent detection circuit (16) configured to activate protection of inductor (L1) when a detection value band-limited by low-pass filter (15) exceeds a threshold.

According to this, highly accurate overcurrent protection can be achieved with an appropriate circuit scale and cost.

[Item 2] Energy transfer circuit (10) according to item 1, further including controller (13) configured to control cell selection circuit (11) and clamp circuit (12), wherein controller (13) controls an inductor current increase state in which a discharge path in which both ends of inductor (L1) are connected to nodes on both sides of discharge cell (C1) is formed, a current flowing from discharge cell (C1) which is the selected cell to be discharged among n cells (C1 to C4) to inductor (L1), and a current flowing through inductor (L1) is increased, a clamp state in which a clamp path in which both ends of inductor (L1) are connected to via clamp switch (Sc1, Sc4) is created, a clamp current flowing between both ends of inductor (L1), and a current flowing through inductor (L1) is circulated in the clamp path, and an inductor current reduction state in which a charge path in which both ends of inductor (L1) are connected to nodes on both sides of charge cell (C2) is created, a current flowing from inductor (L1) to charge cell (C2) which is the selected cell to be charged among n cells (C1 to C4), and a current flowing through inductor (L1) is reduced in this order.

According to this, it is possible to achieve highly sensitive overcurrent detection by utilizing the clamp state.

[Item 3] Energy transfer circuit (10) according to item 2, wherein overcurrent detection circuit (16) instructs controller (13) to transition a state to the clamp state when the detection value exceeds the threshold.

According to this, it is possible to prevent saturation of inductor (L1) while continuing the operation of energy transfer circuit (10).

[Item 4] Energy transfer circuit (10) according to item 1 or 2, wherein overcurrent detection circuit (16) controls at least one clamp switch (Sc1 to Sc4, or Sc) to an OFF state when the detection value exceeds the threshold.

According to this, the saturation of inductor (L1) can be prevented by stopping the operation of energy transfer circuit (10).

[Item 5] Energy transfer circuit (10) according to any one of items 1 to 4, wherein cell selection circuit (11) includes first wiring (W1) connected to one end of inductor (L1), second wiring (W2) connected to the other end of inductor (L1), (n+1) first wiring side switches (S1, S3, S5, S7, S9) that selectively connect one of both ends of the selected cell to first wiring (W1), and (n+1) second wiring side switches (S2, S4, S6, S8, S10) that selectively connect the other of both ends of the selected cell to second wiring (W2), and wherein clamp circuit (12) includes one clamp switch (Sc).

Accordingly, it is possible to constitute one clamp switch (Sc) used for clamp circuit (12).

[Item 6] Energy transfer circuit (10) according to any one of items 1 to 4, wherein cell selection circuit (11) includes first wiring (W1) connected to one end of inductor (L1), second wiring (W2) connected to the other end of inductor (L1), a plurality of first wiring side switches (S1, S5, S9) that is connected between odd-numbered nodes among (n+1) nodes of n cells (C1 to C4) connected in series and first wiring (W1), and at least one second wiring side switch (S4, S8) that is connected between even-numbered nodes among the (n+1) nodes of n cells (C1 to C4) connected in series and second wiring (W2), wherein clamp circuit (12) includes first clamp switch (Sc1) and second clamp switch (Sc2) connected to each other in series and third clamp switch (Sc3) and fourth clamp switch (Sc4) connected to each other in series, wherein inductor (L1) is connected between a node between first clamp switch (Sc1) and second clamp switch (Sc2) and a node between third clamp switch (Sc3) and fourth clamp switch (Sc4), wherein one end, of each of first clamp switch (Sc1) and third clamp switch (Sc3), that is not connected to inductor (L1) is connected to first wiring (W1), wherein one end, of each of second clamp switch (Sc2) and fourth clamp switch (Sc4), that is not connected to inductor (L1) is connected to second wiring (W2), and wherein clamp circuit (12) is connected as a full bridge circuit by inductor (L1), first clamp switch (Sc1), second clamp switch (Sc2), third clamp switch (Sc3), and fourth clamp switch (Sc4).

According to this, it is possible to reduce the number of first wiring side switches (S1, S5, S9) and second wiring side switches (S4, S8).

[Item 7] Energy transfer circuit (10) according to any one of items 1 to 6, wherein a cutoff frequency of low-pass filter (15) is set to more than or equal to a predetermined multiple greater than one (for example, about 10 times) of a drive frequency of at least one clamp switch (Sc1 to Sc4, or Sc).

According to this, the ringing noise can be suppressed without suppressing the inductor current itself.

[Item 8] Energy transfer circuit (10) according to any one of items 1 to 7, wherein a cutoff frequency of low-pass filter (15) is set to less than or equal to a predetermined multiple less than one (for example, about $\frac{1}{10}$ times) of a frequency of a ringing noise superimposed on a current flowing through inductor (L1).

According to this, the ringing noise can be suppressed without suppressing the inductor current itself.

[Item 9] Energy transfer circuit (10) according to item 2, further including voltage detector (14) configured to detect voltages of n cells (C1 to C4), wherein controller (13) executes an equalizing process on n cells (C1 to C4) based on voltages of n cells (C1 to C4) detected by voltage detector (14).

Accordingly, it is possible to achieve the equalizing circuit using the energy transfer.

[Item 10] Energy transfer circuit (10) according to item 9, wherein controller (13) determines a target voltage or a target capacity of n cells (C1 to C4) based on voltages of n cells (C1 to C4) detected by voltage detector (14), determines that a cell with a voltage or a capacity higher than the target voltage or the target capacity is a cell to be discharged, and determines that a cell with a voltage or a capacity lower than the target voltage or the target capacity is a cell to be charged.

Accordingly, active cell balance can be achieved by energy transfer between cells (C1 to C4).

[Item 11] Power storage system (1) including n cells (C1 to C4) connected in series, where n is an integer of 2 or more, and energy transfer circuit (10) according to any one of items 1 to 10.

According to this, it is possible to construct power storage system (1) that achieves highly accurate overcurrent protection at an appropriate circuit scale and cost.

[Item 12] Energy transfer circuit (10M) including inductor (L1M), module selection circuit (11M) provided between m modules (M1 to M4) connected in series, where m is an integer of 2 or more, and inductor (L1M) and capable of conducting both ends of a selected module including any one of m modules (M1 to M4) or a plurality of modules connected in series, and both ends of inductor (L1M), clamp circuit (12M) having clamp switches (Sc1M to Sc4M) for forming a closed loop including inductor (L1M) with module selection circuit (11M) not selecting any modules (M1 to M4), current detection circuit (Rs and AP1) configured to detect a value of a current flowing through inductor (L1M), low-pass filter (15) configured to band-limit a detection value detected by current detection circuit (Rs and AP1), and overcurrent detection circuit (16) configured to activate protection of inductor (L1M) when a detection value band-limited by low-pass filter (15) exceeds a threshold.

According to this, highly accurate overcurrent protection can be achieved with an appropriate circuit scale and cost.

[Item 13] Energy transfer circuit (10M) according to item 12, further including controller (13M) that controls module selection circuit (11M) and clamp circuit (12M), wherein each of m modules (M1 to M4) includes a plurality of cells (C1 to C4) connected in series, cell voltage detector (14) that detects cell voltages of the plurality of cells (C1 to C4), and cell equalizing circuits (10A to 10D) that equalize a plurality of cell voltages within same modules (M1 to M4) based on the cell voltages detected by cell voltage detector (14), and wherein cell equalizing circuits (10A to 10D) operate in cooperation with controller (13M) by communication, and execute an equalizing process on the plurality of cells (C1 to C4) after an equalizing process on m modules (M1 to M4) is executed.

Accordingly, it is possible to efficiently achieve equalization on all cells by concurrently using active module balance by energy transfer between modules (M1 to M4) and active cell balance by energy transfer between cells (C1 to C4).

[Item 14] Power storage system (1M) including m modules (M1 to M4) connected in series, where m is an integer of 2 or more, and energy transfer circuit (10M) according to item 12 or 13.

According to this, it is possible to construct power storage system (1M) that achieves highly accurate overcurrent protection at an appropriate circuit scale and cost.

REFERENCE MARKS IN THE DRAWINGS

1: power storage system
10: equalizing circuit
11: cell selection circuit
12: energy retaining circuit
13: controller
14: voltage detector
15: low-pass filter
16: overcurrent detection circuit
20: power storage
C1-C4: cell
L1: inductor
W1: first wiring
W2: second wiring
S1-S10: switch
Sc1-Sc4: clamp switch
Rs: shunt resistor
Hs: Hall element
AP1: differential amplifier

The invention claimed is:

1. An energy transfer circuit comprising:
an inductor;
a cell selection circuit provided between the inductor and n cells connected in series, where n is an integer of 2 or more, the cell selection circuit being configured to conduct between (i) both ends of a selected cell and (ii) both ends of the inductor, the selected cell being at least one cell selected from the n cells connected in series;
a clamp circuit including at least one clamp switch, the at least one clamp switch forming a closed loop including the inductor in a state where the cell selection circuit does not select any cells;
a current detection circuit configured to detect a value of a current flowing through the inductor;
a low-pass filter configured to band-limit a detection value detected by the current detection circuit;
an overcurrent detection circuit configured to compare the detection value band-limited by the low-pass filter with an overcurrent protection threshold for the inductor and, when the detection value exceeds the overcurrent protection threshold, to output an abnormality stop signal to activate protection of the inductor; and a controller configured to perform, in response to detecting the abnormality stop signal, a protecting operation comprising at least one of:

(1) controlling a clamp state in which a clamp path in which both ends of the inductor are connected to each other via the at least one clamp switch is created, to flow a clamp current between both ends of the inductor, thereby circulating, in the clamp path, the current flowing through the inductor; or (2) stopping an operation of the energy transfer circuit.

2. The energy transfer circuit according to claim 1, wherein the controller controls an inductor current increase state in which a discharge path in which the both ends of the inductor are connected to nodes on both sides of a discharge cell is formed to flow a current from the discharge cell to the inductor, thereby increasing the current flowing through the inductor, the discharge cell being the selected cell to be discharged among the n cells, and an inductor current reduction state in which a charge path in which the both ends of the inductor are connected to nodes on both sides of a charge cell is created to flow current from the inductor to the charge cell, thereby reducing the current flowing through the inductor, the charge cell being the selected cell to be charged among the n cells, and the controller performs the control of the inductor current increase state, the control of the clamp state, and the control of the inductor current reduction state in this order.

3. The energy transfer circuit according to claim 2, further comprising a voltage detector configured to detect respective voltages of the n cells, wherein the controller executes an equalizing process on the n cells based on the respective voltages of the n cells detected by the voltage detector.

4. The energy transfer circuit according to claim 3, wherein the controller determines a target voltage or a target capacity of the n cells based on the respective voltages of the n cells detected by the voltage detector, determines that a cell with a voltage or a capacity higher than the target voltage or the target capacity is the discharge cell, and determines that a cell with a voltage or a capacity lower than the target voltage or the target capacity is the charge cell.

5. The energy transfer circuit according to claim 1, wherein the overcurrent detection circuit controls the at least one clamp switch to an OFF state when the detection value exceeds the overcurrent protection threshold.

6. The energy transfer circuit according to claim 1, wherein the cell selection circuit includes first wiring connected to one end of the inductor, second wiring connected to another end of the inductor, (n+1) first wiring switches that selectively connect one of both ends of the selected cell to the first wiring, and (n+1) second wiring switches that selectively connect another of both ends of the selected cell to the second wiring, and the clamp circuit includes one of the at least one clamp switch.

7. The energy transfer circuit according to claim 1, wherein the cell selection circuit includes first wiring connected to one end of the inductor, second wiring connected to another end of the inductor, a plurality of first wiring switches that is connected between odd-numbered nodes among (n+1) nodes of the n cells connected in series and the first wiring, and at least one second wiring switch that is connected between even-numbered nodes among the (n+1) nodes of the n cells connected in series and the second wiring, the clamp circuit includes a first clamp switch and a second clamp switch connected to each other in series and a third clamp switch and a fourth clamp switch connected to each other in series, the inductor is connected between a node between the first clamp switch and the second clamp switch and a node between the third clamp switch and the fourth clamp switch, one end, of each of the first clamp switch and the third clamp switch, that is not connected to the inductor is connected to the first wiring, one end, of each of the second clamp switch and the fourth clamp switch, that is not connected to the inductor is connected to the second wiring, and the clamp circuit is connected as a full bridge circuit by the inductor, the first clamp switch, the second clamp switch, the third clamp switch, and the fourth clamp switch.

8. The energy transfer circuit according to claim 1, wherein a cutoff frequency of the low-pass filter is set to more than or equal to a predetermined multiple greater than one of a drive frequency of the at least one clamp switch.

9. The energy transfer circuit according to claim 1, wherein the cutoff frequency of the low-pass filter is set to less than or equal to a predetermined multiple less than one of a frequency of a ringing noise superimposed on the current flowing through the inductor.

10. A power storage system comprising:

the energy transfer circuit according to claim 1; and the n cells connected in series, where n is an integer of 2 or more.

11. The energy transfer circuit according to claim 1, wherein the protecting operation is controlling the clamp to flow the clamp current between both ends of the inductor, thereby circulating, in the clamp path, the current flowing through the inductor.

12. The energy transfer circuit according to claim 1, wherein the protecting operation is stopping the operation of the energy transfer circuit.

13. An energy transfer circuit comprising:

an inductor;

a module selection circuit provided between m modules connected in series, where m is an integer of 2 or more, and the inductor and configured to conduct both ends of a selected module including any one of the m modules or a plurality of modules connected in series, and both ends of the inductor;

a clamp circuit including a clamp switch for forming a closed loop including the inductor in a state where the module selection circuit not selecting any modules;

a current detection circuit configured to detect a value of a current flowing through the inductor;

a low-pass filter configured to band-limit a detection value detected by the current detection circuit; and an overcurrent detection circuit configured to compare the detection value band-limited by the low-pass filter with an overcurrent protection threshold for the inductor and, when the detection value exceeds the overcurrent protection threshold, to output an abnormality stop signal to activate protection of the inductor; and a controller configured to perform, in response to detecting the abnormality stop signal, a protecting operation comprising at least one of:

(1) controlling a clamp state in which a clamp path in which both ends of the inductor are connected to each other via the at least one clamp switch is created, to flow a clamp current between both ends of the inductor, thereby circulating, in the clamp path, the current flowing through the inductor; or (2) stopping an operation of the energy transfer circuit.

14. The energy transfer circuit according to claim 13, wherein each of the m modules includes a plurality of cells connected in series, a cell voltage detector configured to detect respective cell voltages of the plurality of cells, and a cell equalizing circuit configured to equalize a plurality of cell voltages within a same module based on the respective cell voltages detected by the cell voltage detector, and the cell equalizing circuit operates in cooperation with the controller by communication, and executes an equalizing process on the plurality of cells after an equalizing process on the m modules is executed.

15. A power storage system, comprising:

the energy transfer circuit according to claim 13; and the m modules connected in series, where m is an integer of 2 or more.

16. The energy transfer circuit according to claim 13, wherein the protecting operation is controlling the clamp to flow the clamp current between both ends of the inductor, thereby circulating, in the clamp path, the current flowing through the inductor.

17. The energy transfer circuit according to claim 13, wherein the protecting operation is stopping the operation of the energy transfer circuit.

* * * * *